United States Patent
You et al.

(10) Patent No.: US 12,052,592 B2
(45) Date of Patent: Jul. 30, 2024

(54) METHOD FOR MANAGING BEAM PERFORMED BY TERMINAL IN WIRELESS COMMUNICATION SYSTEM, AND TERMINAL USING SAME

(71) Applicant: LG ELECTRONICS INC., Seoul (KR)

(72) Inventors: Hyangsun You, Seoul (KR); Yunjung Yi, Seoul (KR); Daesung Hwang, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 478 days.

(21) Appl. No.: 17/288,673

(22) PCT Filed: Nov. 4, 2019

(86) PCT No.: PCT/KR2019/014811
§ 371 (c)(1),
(2) Date: Apr. 26, 2021

(87) PCT Pub. No.: WO2020/091553
PCT Pub. Date: May 7, 2020

(65) Prior Publication Data
US 2021/0400507 A1    Dec. 23, 2021

Related U.S. Application Data

(60) Provisional application No. 62/755,399, filed on Nov. 2, 2018, provisional application No. 62/755,401, filed
(Continued)

(51) Int. Cl.
*H04W 24/08*    (2009.01)
*H04B 7/06*    (2006.01)
(Continued)

(52) U.S. Cl.
CPC .......... *H04W 24/08* (2013.01); *H04L 5/0048* (2013.01); *H04W 72/23* (2023.01); *H04W 76/28* (2018.02)

(58) Field of Classification Search
CPC ..... H04W 24/08; H04W 76/28; H04W 72/23; H04L 5/0048
(Continued)

(56) References Cited

U.S. PATENT DOCUMENTS

2012/0033595 A1*    2/2012  Aoyama ............... H04W 76/28
                                                       370/311
2018/0278314 A1*    9/2018  Nam ..................... H04W 72/23
(Continued)

OTHER PUBLICATIONS

Samsung R2-1801414 (NR C-DRX enhancement considering beamforming, Jan. 21-25, 2018). (Year: 2018).*
(Continued)

*Primary Examiner* — Xuan Lu
(74) *Attorney, Agent, or Firm* — BRYAN CAVE LEIGHTON PAISNER LLP

(57) ABSTRACT

Provided are a method for managing a beam performed by a terminal in a wireless communication system and a device using the method. According to the method, the terminal performs a power saving operation on a first cell and receives a PDCCH through a second cell, wherein the PDCCH requests to measure a reference signal transmitted aperiodically in the first cell. The reference signal is received at a particular time for a DRX cycle related to the power saving operation. The terminal generates beam related information to be used in the first cell by measuring the reference signal in the first cell.

14 Claims, 30 Drawing Sheets

Related U.S. Application Data on Nov. 2, 2018, provisional application No. 62/755,396, filed on Nov. 2, 2018.

(51) Int. Cl.

| | | |
|---|---|---|
| H04B 7/08 | (2006.01) | |
| H04L 5/00 | (2006.01) | |
| H04W 16/28 | (2009.01) | |
| H04W 52/02 | (2009.01) | |
| H04W 72/23 | (2023.01) | |
| H04W 76/19 | (2018.01) | |
| H04W 76/27 | (2018.01) | |
| H04W 76/28 | (2018.01) | |

(58) Field of Classification Search
USPC .......................................................... 370/252
See application file for complete search history.

(56) References Cited

U.S. PATENT DOCUMENTS

| | | | | |
|---|---|---|---|---|
| 2020/0068497 | A1* | 2/2020 | Gong | .................... H04W 52/42 |
| 2020/0137602 | A1* | 4/2020 | Zhang | .................... H04W 72/23 |
| 2020/0229002 | A1* | 7/2020 | Kaikkonen | ......... H04W 56/001 |
| 2021/0314866 | A1* | 10/2021 | Lee | ................... H04W 52/0229 |

OTHER PUBLICATIONS

Qualcomm R1-1811282 (UE Adaptation to the Traffic and UE Power Consumption Characteristics, Oct. 8-12, 2018). (Year: 2018).*

Qualcomm Incorporated, UE Adaptation to the Traffic and UE Power Consumption Characteristics, R1-1811282, 3GPP TSG RAN WG1 #94b, Chengdu, China, Sep. 29, 2018, See pp. 1-17, figure 2.

Qualcomm Incorporated, Triggering Adaptation of UE Power Consumption Characteristics, R1-1811283, 3GPP TSG RAN WG1 #94b, Chengdu, China, Sep. 29, 2018, See pp. 1-12.

Samsung NR C-DRX enhancement considering beamforming, R2-1801414, 3GPP TSG RAN WG2 #AH, Vancouver, Canada, Jan. 12, 2018, See sections 1-3.

Apple Inc., Potential Enhancements for NR UE Power Saving, R1-1804773, 3GPP TSG RAN WG1 #92b, Sanya, China, Apr. 7, 2018, See pp. 1-5.

Mediatek Inc., On UE power saving for NR, R1-1806803, 3GPP TSG RAN WG1 #93, Busan, Korea, May 12, 2018, See sections 1-3.

* cited by examiner

METHOD FOR MANAGING BEAM PERFORMED BY TERMINAL IN WIRELESS COMMUNICATION SYSTEM, AND TERMINAL USING SAME

This application is the National Stage filing under 35 U.S.C. 371 of International Application No. PCT/KR2019/014811 filed on Nov. 4, 2019, which claims the benefit of U.S. Provisional Application No. 62/755,396 filed on Nov. 2, 2018; U.S. Provisional Application No. 62/755,399 filed on Nov. 2, 2018 and 62/755,401 filed on Nov. 2, 2018, the contents of which are all hereby incorporated by reference herein in their entirety.

BACKGROUND OF THE DISCLOSURE

Field of the Disclosure

The present disclosure relates to wireless communication, and more particularly, to a beam management method performed by a terminal in a wireless communication system and a device using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, a terminal (or user equipment (UE)) may operate in a power saving mode or in an OFF state of discontinuous reception (DRX) in a specific time period. During the time period, the terminal may not perform a beam management operation to reduce power consumption. That is, beam management information cannot be updated during the time period. If the time period is long, existing beam management information may be significantly different from a current channel state. In this case, the terminal exits the power saving mode or enters a DRX ON state, and when the terminal receives a downlink signal again, receiving of the downlink signal or monitoring of a control channel may not be properly performed because the beam management information has not been updated. However, in order to solve this problem, continuously performing the beam management process by the terminal which operates in the power saving mode is not desirable because power consumption of the terminal is too large and there may be a delay in receiving a downlink signal.

SUMMARY

The present disclosure provides a beam management method performed by a terminal in a wireless communication system and a device using the method.

Advantageous Effects

In one aspect, provided is a beam management method performed by a terminal in a wireless communication system. The method includes performing a power saving operation on a first cell, receiving a physical downlink control channel (PDCCH) through a second cell, the PDCCH requesting to measure a reference signal aperiodically transmitted from the first cell, and measuring the reference signal in the first cell to generate beam-related information to be used in the first cell. The reference signal is received at a start point of a discontinuous reception (DRX) ON duration or before a specific time from the start point for a DRX cycle including the DRX ON duration and a DRX OFF duration.

In another aspect, provided is a user equipment. The UE includes a transceiver configured to transmit and receive a wireless signal and a processor operably coupled with the transceiver. The processor is configured to: perform a power saving operation on a first cell, receive a physical downlink control channel (PDCCH) through a second cell, the PDCCH requesting to measure a reference signal aperiodically transmitted from the first cell, and measure the reference signal in the first cell to generate beam-related information to be used in the first cell. The reference signal is received at a start point of a discontinuous reception (DRX) ON duration or before a specific time from the start point for a DRX cycle including the DRX ON duration and a DRX OFF duration.

In a still another aspect, provided is a processor for a wireless communication device. The processor controlling the wireless communication device to perform a power saving operation on a first cell, to receive a physical downlink control channel (PDCCH) through a second cell, the PDCCH requesting to measure a reference signal aperiodically transmitted from the first cell, and to measure the reference signal in the first cell to generate beam-related information to be used in the first cell. The reference signal is received at a start point of a discontinuous reception (DRX) ON duration or before a specific time from the start point for a DRX cycle including the DRX ON duration and a DRX OFF duration.

When receiving a downlink signal or performing PDCCH monitoring again after a power saving mode or a DRX OFF operation, the terminal may receive the downlink signal or perform PDCCH monitoring faster than before. Also, in this process, a beam having good quality may be used.

DESCRIPTION OF EXEMPLARY EMBODIMENTS

In the following disclosure, "/" and "," should be interpreted as indicating "and/or". For example, "A/B" may refer to "A and/or B". "A, B" may refer to "A and/or B". "A/B/C" may refer to "at least one of A, B, and/or C". "A, B, C" may refer to "at least one of A, B, and/or C".

In the following disclosure, "or" should be interpreted as indicating "and/or". For example, "A or B" may include "only A", "only B", and/or "both A and B". In other words, in the following disclosure, "or" should be interpreted as indicating "additionally or alternatively".

Figure 1:
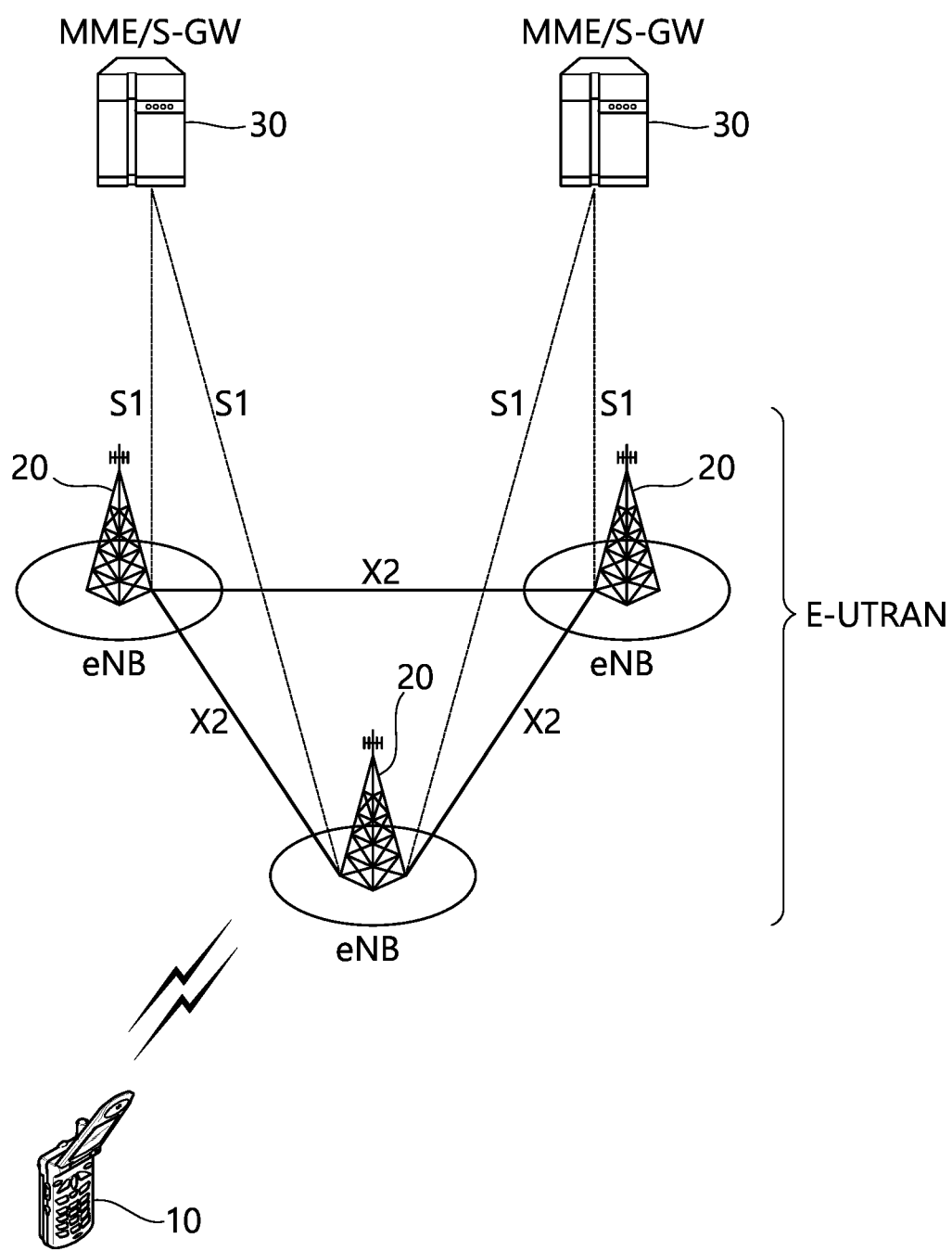
FIG. 1 shows a wireless communication system.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
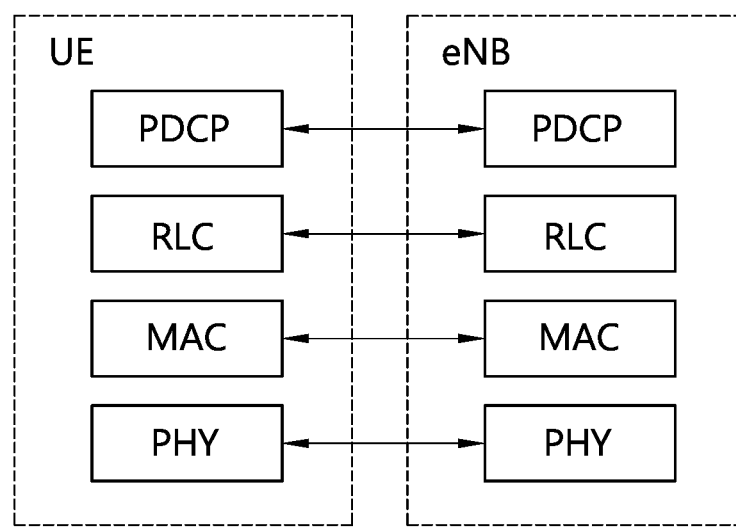
FIG. 2 is a diagram showing a wireless protocol architecture for a user plane.
Figure 3:
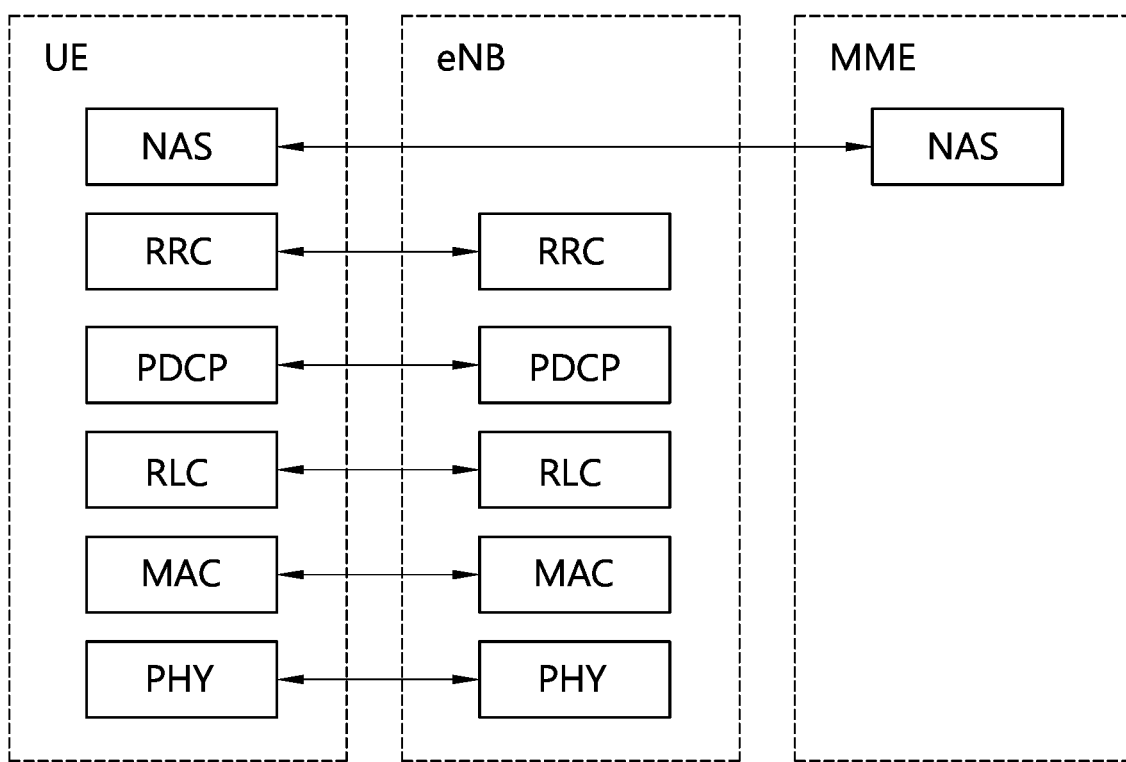
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC), is discussed. This new technology may be called new radio access technology (new RAT or NR) in the present disclosure for convenience.

Figure 4:
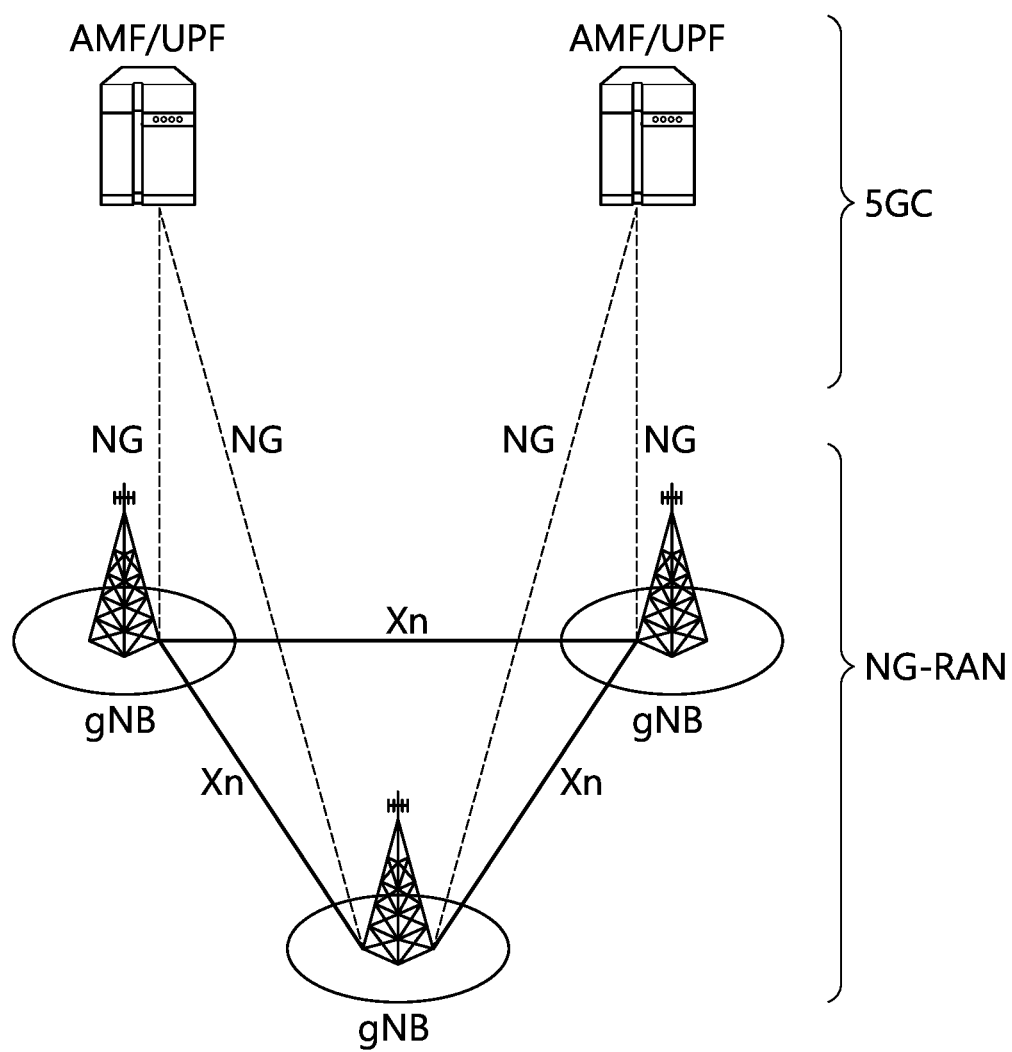
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
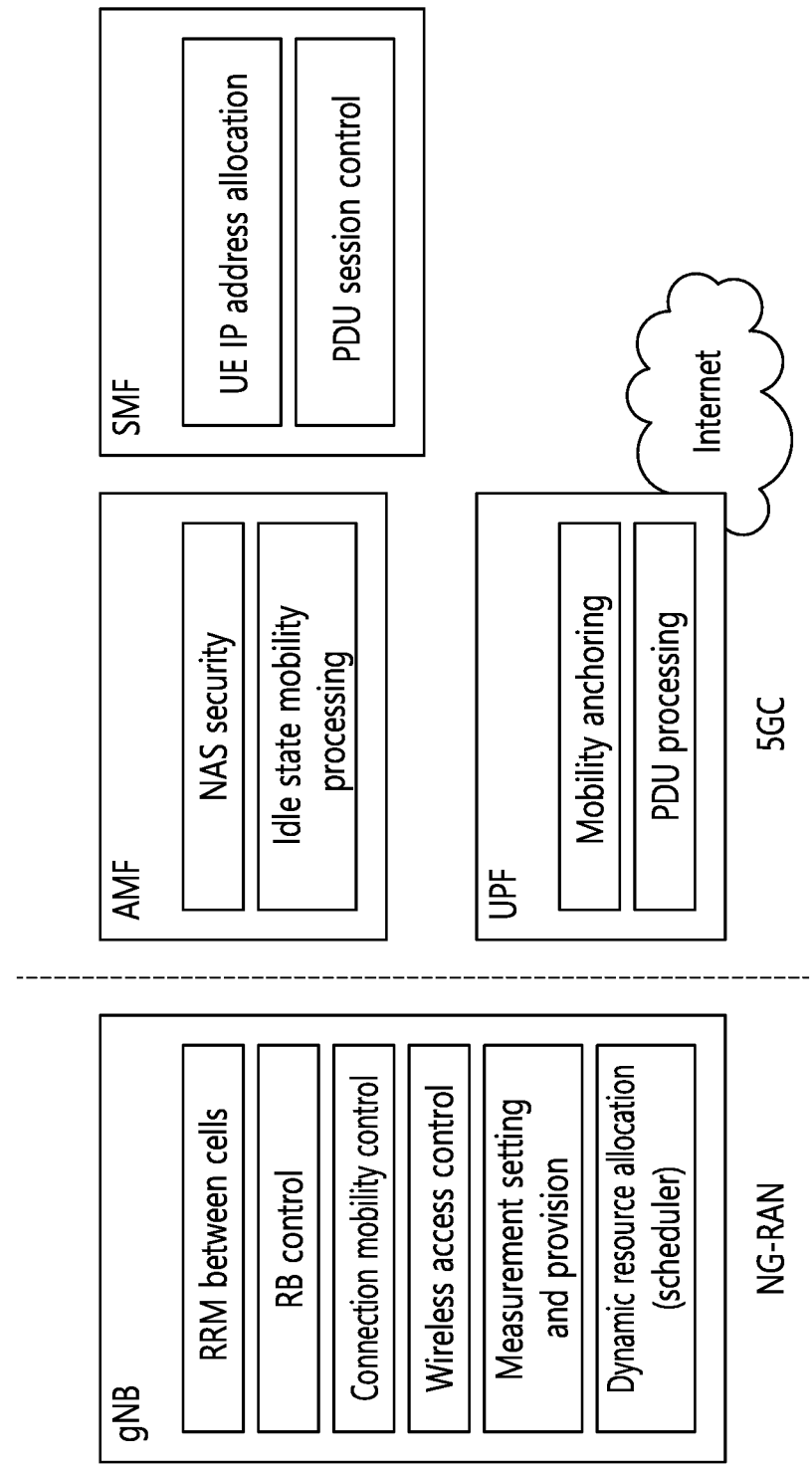
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
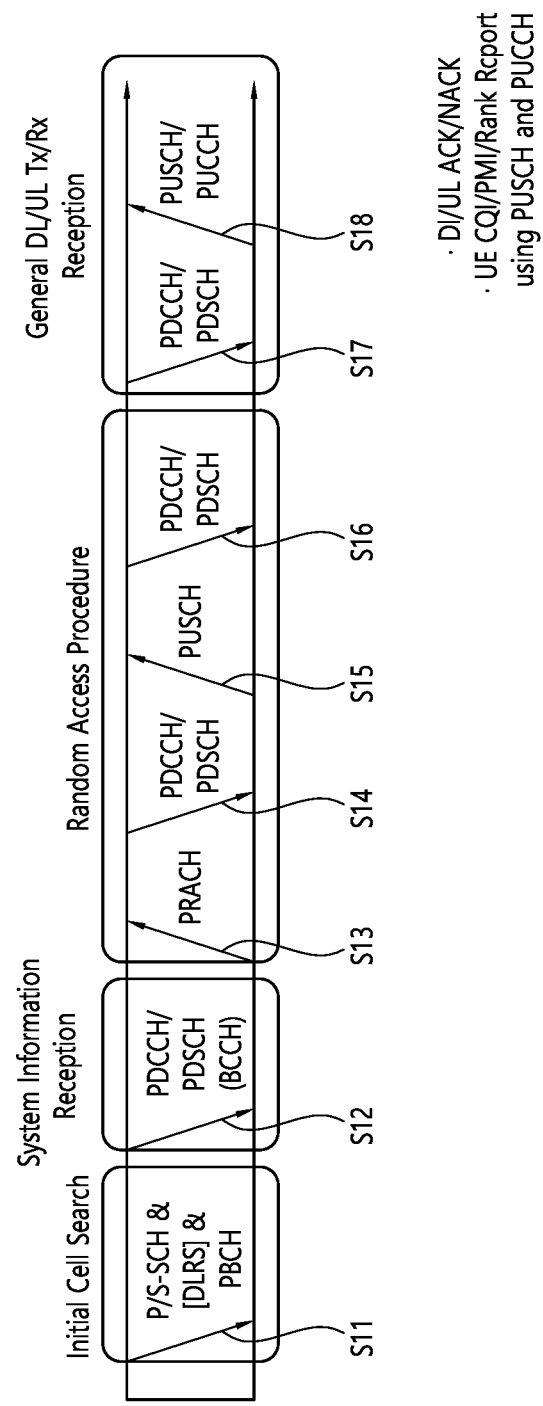
FIG. 6 illustrates physical channels and general signal transmission.

FIG. 6 illustrates physical channels and general signal transmission.

Referring to FIG. 6, in a wireless communication system, a user equipment (UE) (or terminal) receives information from a base station (BS) through a downlink (DL), and the UE transmits information to a BS through an uplink (UL). Information transmitted and received by the base station and the UE includes data and various control information, and various physical channels exist according to types/purposes of information transmitted and received by the BS and the UE.

When power is turned on again in a state where power was turned off or when the UE newly enters a cell, the UE performs an initial cell search operation such as synchronizing with the BS (S11). To this end, the UE is synchronized with the BS upon receiving a primary synchronization channel (PSCH) and a secondary synchronization channel (SSCH) from the BS, and acquires information such as cell identity (cell ID). In addition, the UE may acquire intra-cell broadcast information upon receiving a physical broadcast channel (BPCH) from the BS. In addition, the UE may check a downlink channel state upon receiving a downlink reference signal (DL RS) in an initial cell search step.

After completing the initial cell search, the UE may acquire more detailed system information upon receiving a physical downlink control channel (PDCCH) and a physical downlink control channel (PDSCH) corresponding thereto (S12).

Thereafter, the UE may perform a random access procedure to complete access to the BS (S13 to S16). Specifically, the UE may transmit a preamble through a physical random access channel (PRACH) (S13) and receive a random access response (RAR) for the preamble through a PDCCH and a PDSCH corresponding thereto (S14). Thereafter, the UE may transmit a physical uplink shared channel (PUSCH) using scheduling information in the RAR (S15) and perform a contention resolution procedure such as the PDCCH and the corresponding PDSCH (S16).

After performing the aforementioned procedure, the UE may perform PDCCH/PDSCH reception (S17) and PUSCH/physical uplink control channel (PUCCH) transmission (S18) as a general uplink/downlink signal transmission procedure. Control information transmitted by the UE to the BS is referred to as uplink control information (UCI). The UCI may include a hybrid automatic repeat and request (HARQ) acknowledgement/negative-acknowledgement/negative (ACK NACK), a scheduling request (SR), channel state information (CSI), and the like. The CSI may include a channel quality indicator (CQI), a precoding matrix indicator (PMI), a rank indication (RI), and the like. The UCI is generally transmitted through the PUCCH, but may be transmitted through PUSCH when control information and data are to be transmitted at the same time. In addition, the UE may aperiodically transmit the UCI through the PUSCH according to a request/instruction of a network.

Figure 7:
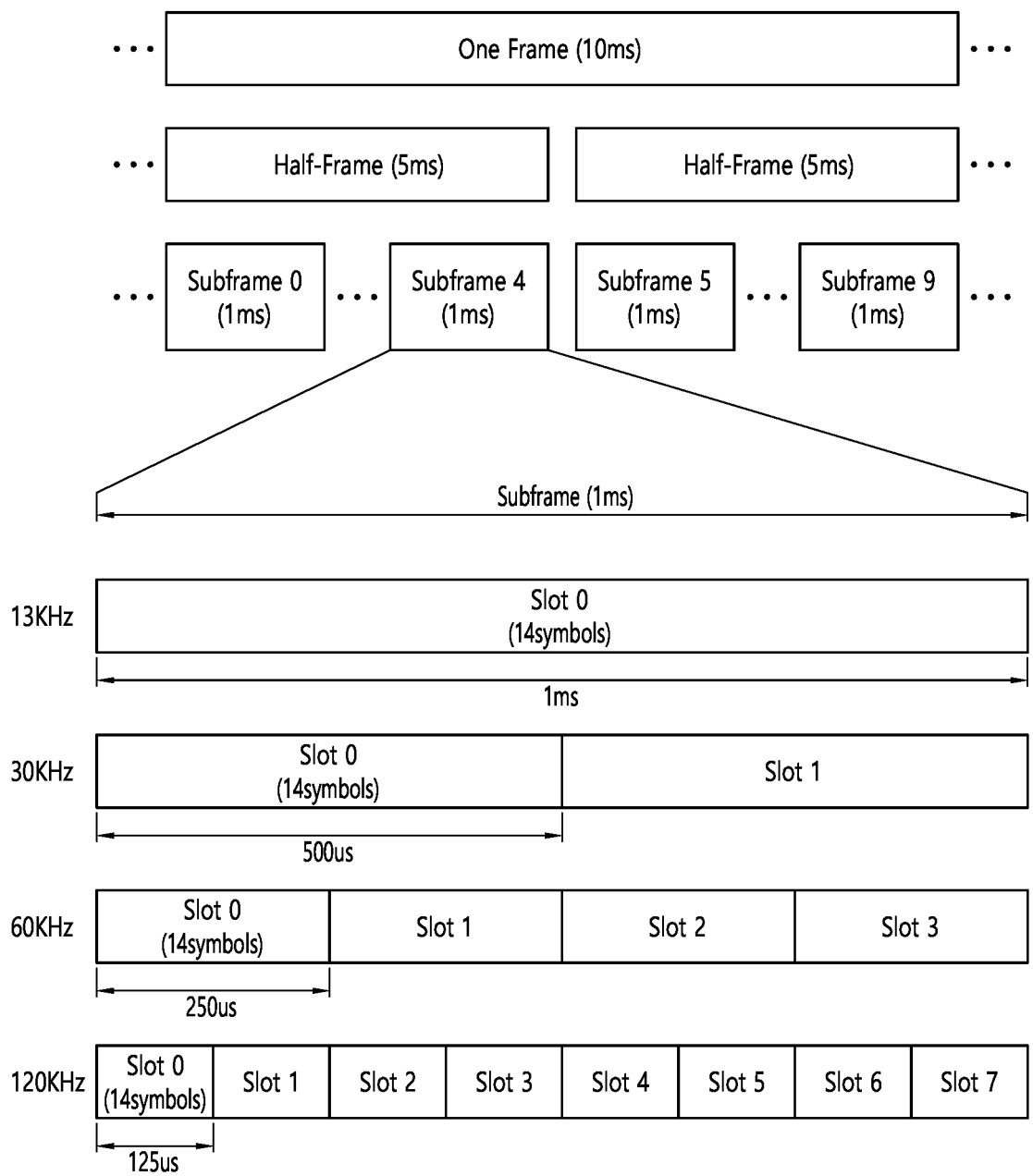
FIG. 7 illustrates an example of a frame structure that may be applied in NR.

FIG. 7 illustrates a frame structure that may be applied in NR.

Referring to FIG. 7, a frame may consist of 10 milliseconds (ms) and may include 10 subframes consisting of 1 ms.

A subframe may include one or a plurality of slots according to a subcarrier spacing (SCS).

The following table 1 illustrates a subcarrier spacing configuration μ.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal Extended |
| 3 | 120 | normal |
| 4 | 240 | normal |

Table 1-1 below illustrates the number of symbols per slot, the number of slots per frame, and the number of slots per subframe depending on the SCS, in case of using an extended CP.

TABLE 1-1

| SCS ($2^\mu \cdot 15$) | $N^{slot}_{symb}$ | $N^{frame, \mu}_{slot}$ | $N^{subframe, u}_{slot}$ |
|---|---|---|---|
| 60 KHz (μ = 2) | 12 | 40 | 4 |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 7 illustrates a case of μ=0, 1, 2, 3.

A physical downlink control channel (PDCCH) may include one or more control channel elements (CCE) as shown in Table 3 below.

TABLE 3

| Aggregation level | Number of CCEs |
|---|---|
| 1 | 1 |
| 2 | 2 |
| 4 | 4 |

TABLE 3-continued

| Aggregation level | Number of CCEs |
|---|---|
| 8 | 8 |
| 16 | 16 |

That is, the PDCCH may be transmitted through a resource consisting of 1, 2, 4, 8, or 16 CCEs. Here, the CCE includes six resource element groups (REGs), and one REG includes one resource block in the frequency domain and one orthogonal frequency division multiplexing (OFDM) symbol in the time domain.

Figure 8:
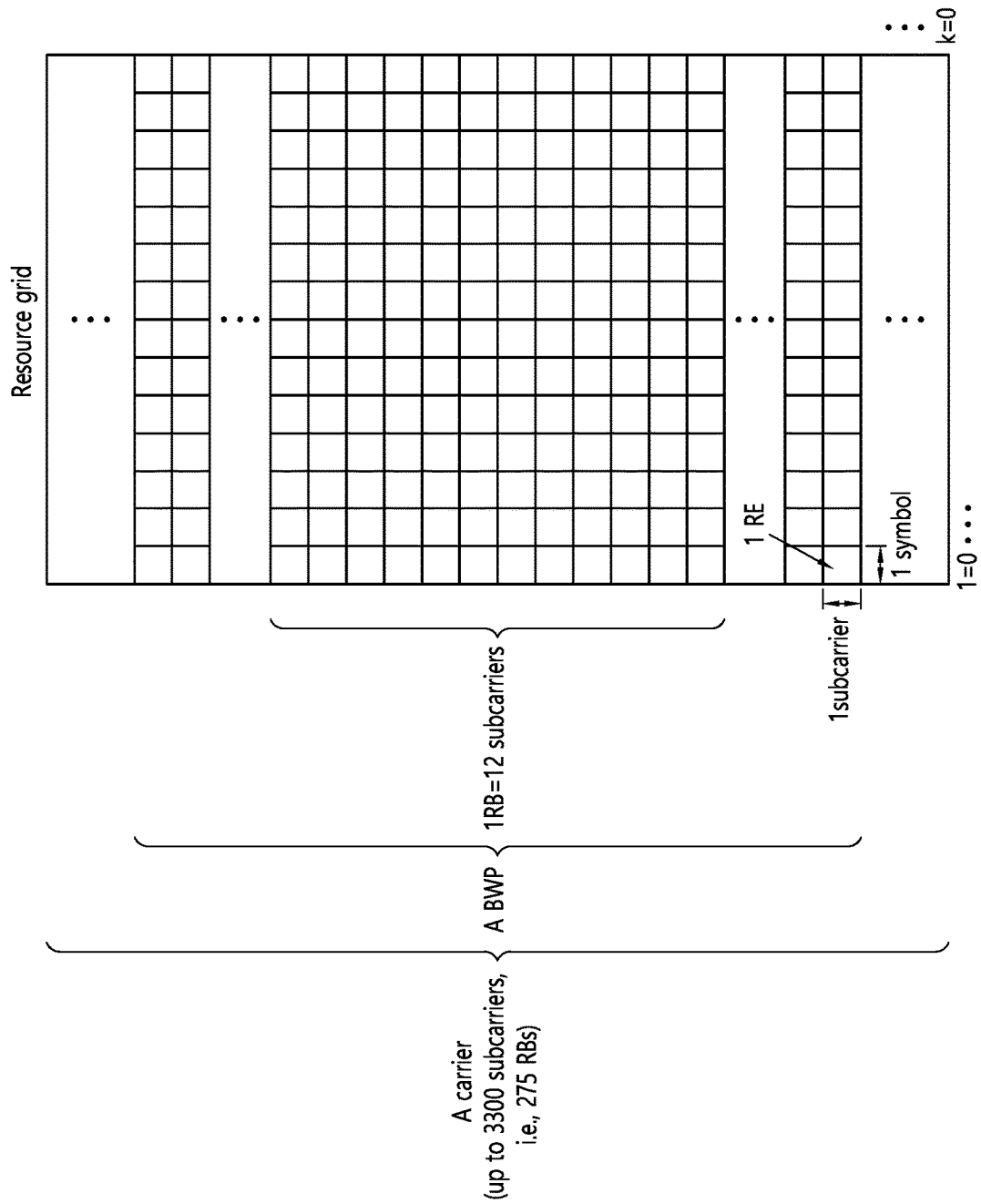
FIG. 8 illustrates a slot structure of an NR frame.

FIG. 8 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

Meanwhile, a new unit called a control resource set (CORESET) may be introduced in the NR. The UE may receive a PDCCH in the CORESET.

Figure 9:
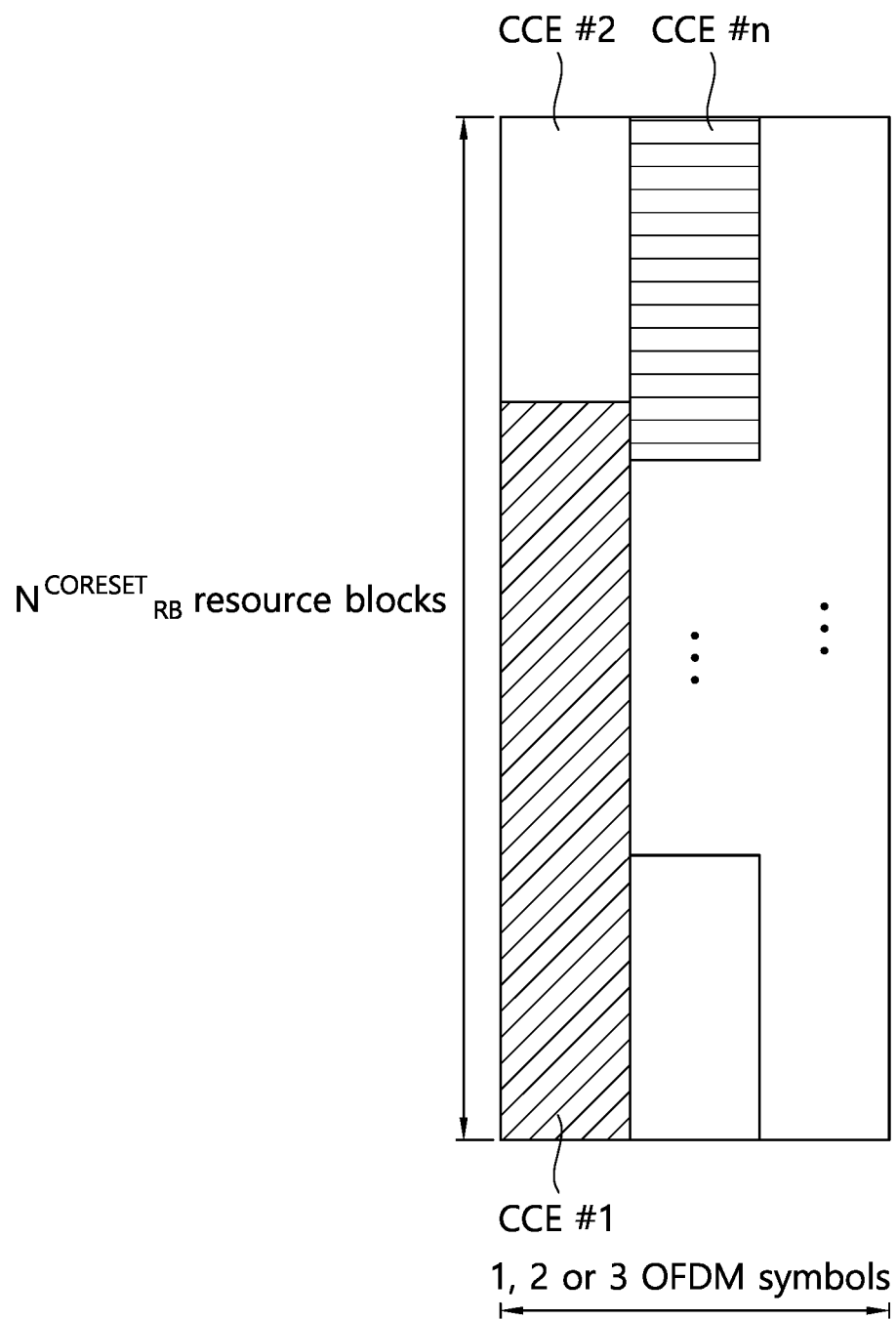
FIG. 9 illustrates CORESET.

FIG. 9 illustrates CORESET.

Referring to FIG. 9, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 9, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates. A plurality of CORESETs may be configured for the terminal.

Figure 10:
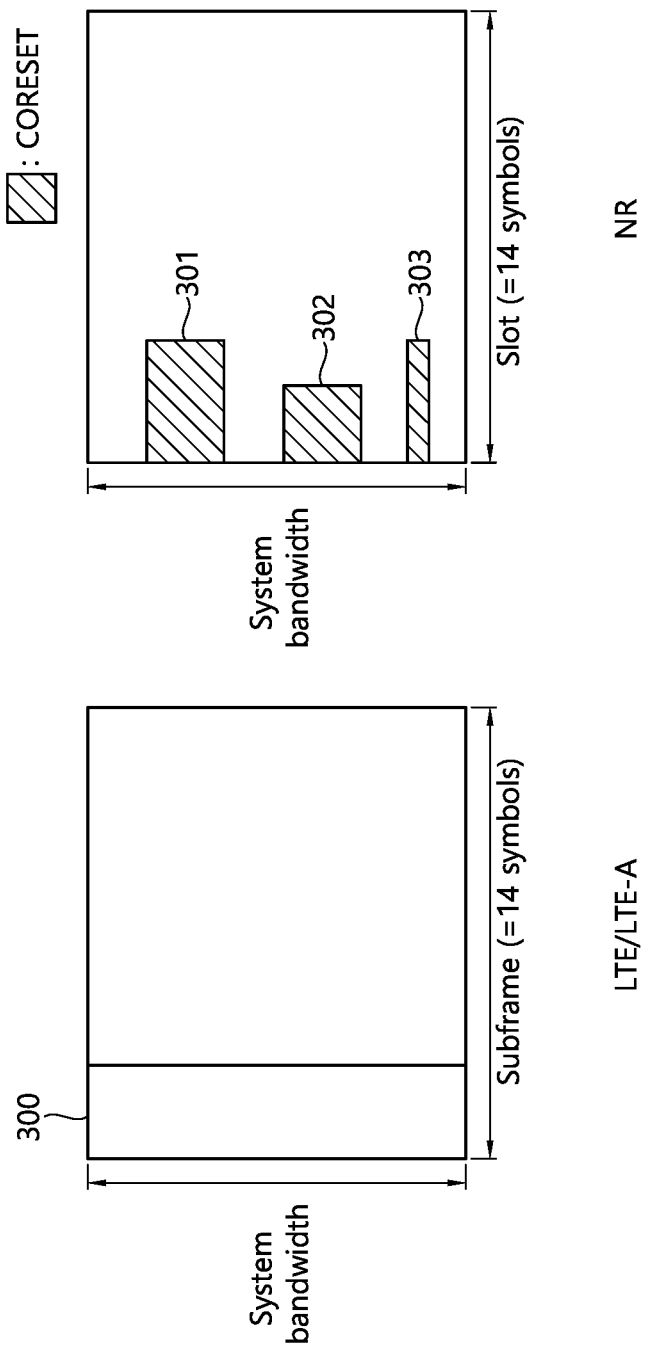
FIG. 10 is a diagram illustrating a difference between a related art control region and the CORESET in NR.

FIG. 10 is a diagram illustrating a difference between a related art control region and the CORESET in NR.

Referring to FIG. 10, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 10, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 11:
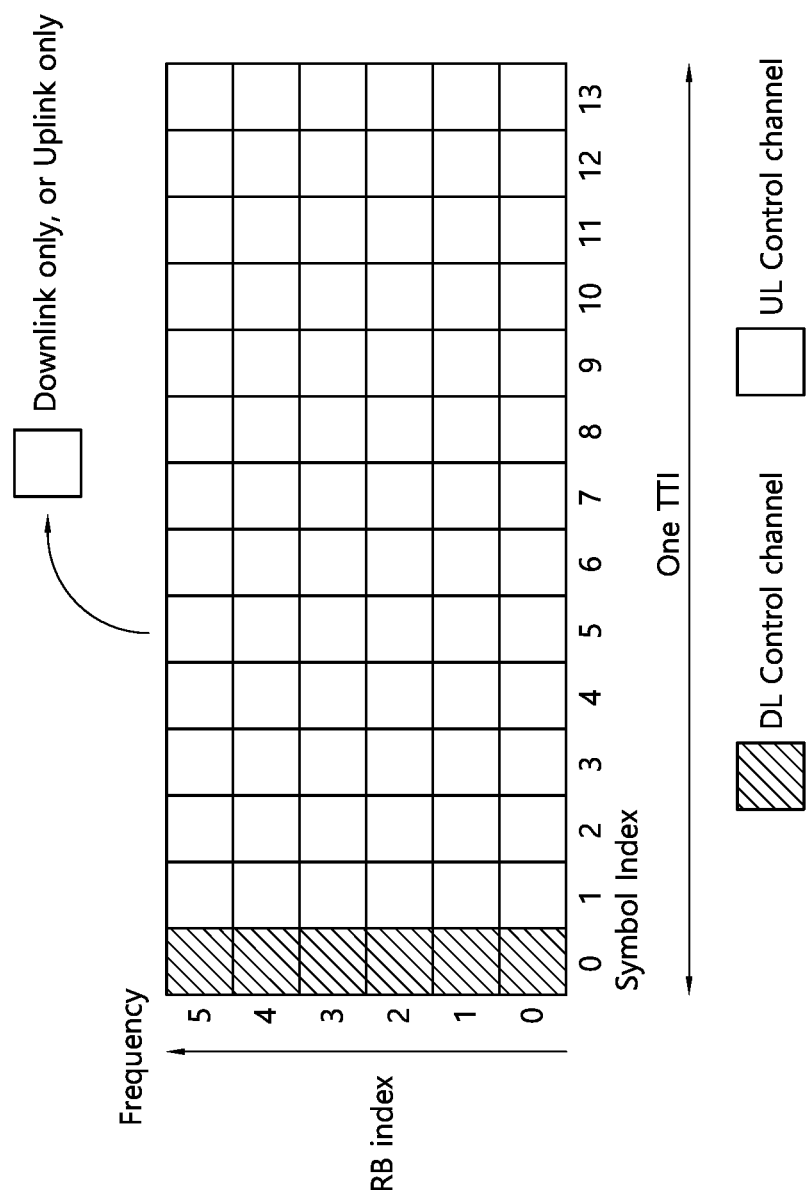
FIG. 11 illustrates an example of a frame structure for new radio access technology.

FIG. 11 illustrates an example of a frame structure for new radio access technology.

In NR, a structure in which a control channel and a data channel are time-division-multiplexed within one TTI, as shown in FIG. 11, can be considered as a frame structure in order to minimize latency.

In FIG. 11, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 12:
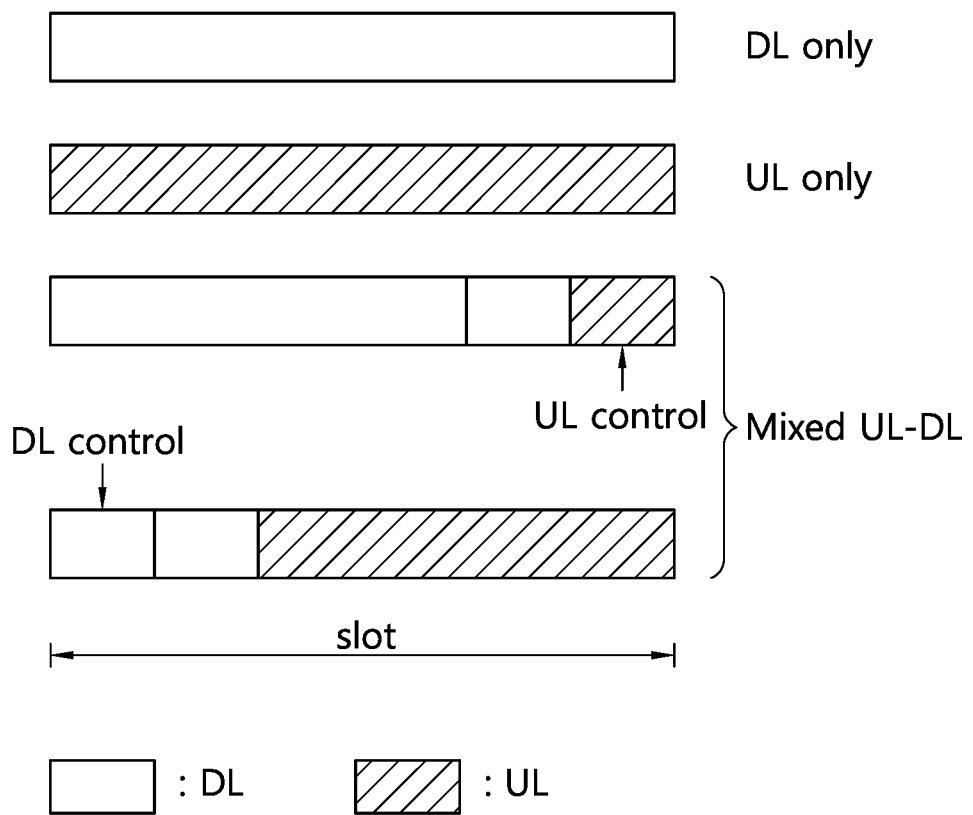
FIG. 12 illustrates a structure of a self-contained slot.

FIG. 12 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 13:
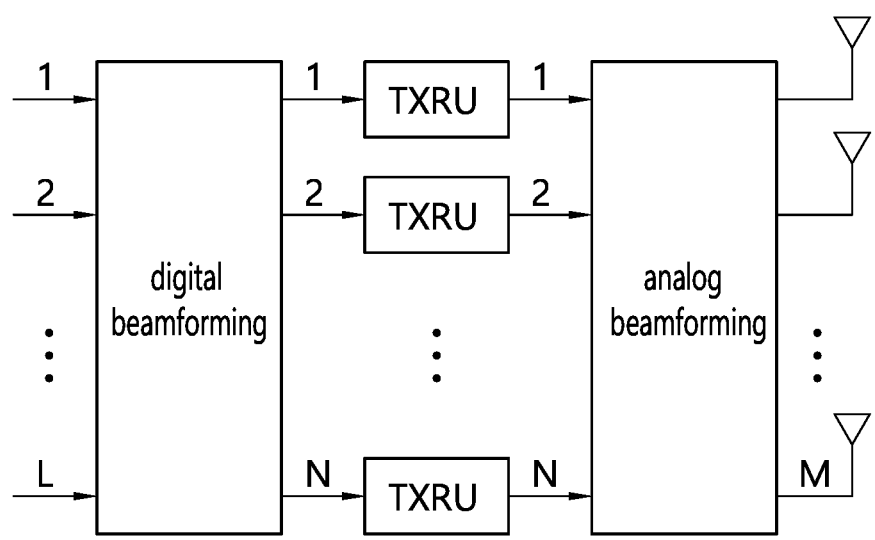
FIG. 13 is an abstract diagram of a hybrid beamforming structure from the viewpoint of the TXRU and the physical antenna.

FIG. 13 is an abstract diagram of a hybrid beamforming structure from the viewpoint of the TXRU and the physical antenna.

In FIG. 13, the number of digital beams is L, and the number of analog beams is N. Furthermore, the NR system considers a direction supporting more efficient beamforming for a UE located in a specific area by designing a BS to change analog beamforming in units of symbols. Furthermore, the NR system considers even a method of introducing a plurality of antenna panels to which independent hybrid beamforming may be applied, when specific N TXRUs and M RF antennas are defined as one antenna panel in FIG. 13.

As described above, when a BS uses a plurality of analog beams, analog beams advantageous for signal reception may be different for each UE, and thus, regarding at least a synchronization signal, system information, paging, etc., a beam sweeping operation in which a plurality of analog beams to be applied by a BS in a specific subframe is changed for each symbol so that all Ues may have a reception opportunity is considered.

Figure 14:
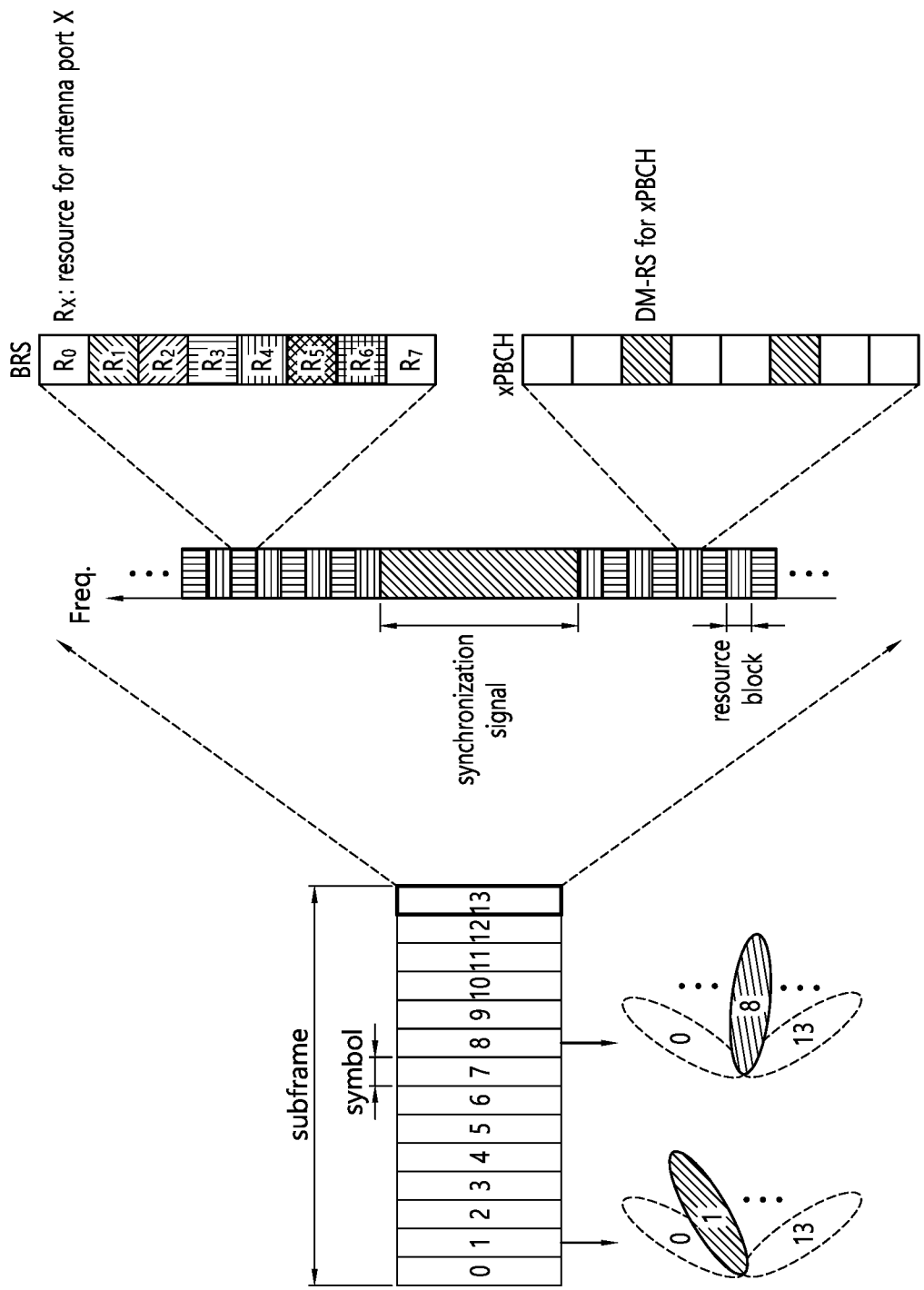
FIG. 14 is a diagram illustrating a beam sweeping operation for a synchronization signal and system information in a downlink (DL) transmission process.

FIG. 14 is a diagram illustrating a beam sweeping operation for a synchronization signal and system information in a downlink (DL) transmission process.

In FIG. 14, a physical resource (or a physical channel) through which system information of an NR system is transmitted in a broadcasting manner is referred to as a physical broadcast channel (xPBCH). Here, analog beams belonging to different antenna panels within one symbol may be simultaneously transmitted, and in order to measure a channel for each analog beam, a method of introducing a beam reference signal (BRS), which is a reference signal (RS) to which a single analog beam (corresponding to a specific antenna panel) is applied and transmitted, as shown in FIG. 14, is under discussion. The BRS may be defined for a plurality of antenna ports, and each antenna port of the BRS may correspond to a single analog beam. In this case, unlike BRS, all analog beams of an analog beam group may be applied to a synchronization signal or xPBCH to transmit the synchronization signal or xPBCH so that any UE may properly receive the synchronization signal or xPBCH.

Meanwhile, a plurality of bandwidth parts (=bandwidth parts) may be configured for the UE.

Figure 15:
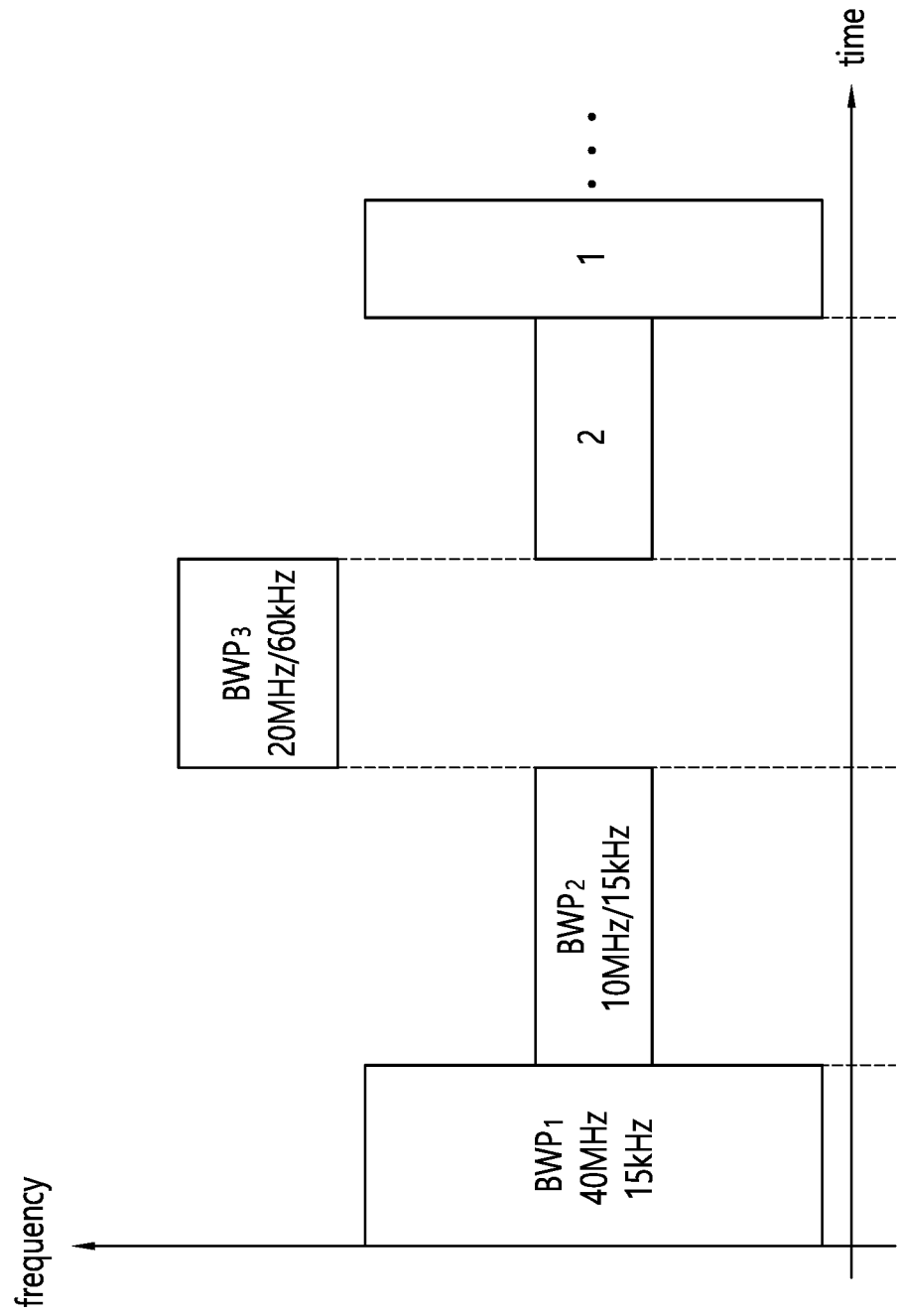
FIG. 15 illustrates a scenario in which three different bandwidth parts are configured.

FIG. 15 illustrates a scenario in which three different bandwidth parts are configured.

FIG. 15 shows an example in which $BWP_1$, $BWP_2$, and $BWP_3$ are configured on a time-frequency resource. $BWP_1$ may have a width of 40 MHz and a subcarrier spacing of 15 kHz, $BWP_2$ may have a width of 10 MHz and a subcarrier spacing of 15 kHz, and $BWP_3$ may have a width of 20 MHz and a subcarrier spacing of 60 kHz. In other words, the bandwidth parts may separately have different widths and/or different subcarrier spacings.

With regard to a reduction in power consumption in RRM measurement, the following technique may be considered. If two measurement types are available, RRM configuration may include beam measurement information (for layer 3 mobility) related to the SSB(s) and CSI-RS(s) for the reported cell(s). In addition, when CA is configured, RRM configuration may include a list of best cells on each frequency in which measurement information is available. In addition, the RRM measurement information may include beam measurement for listed cells belonging to a target gNB.

Figure 16:
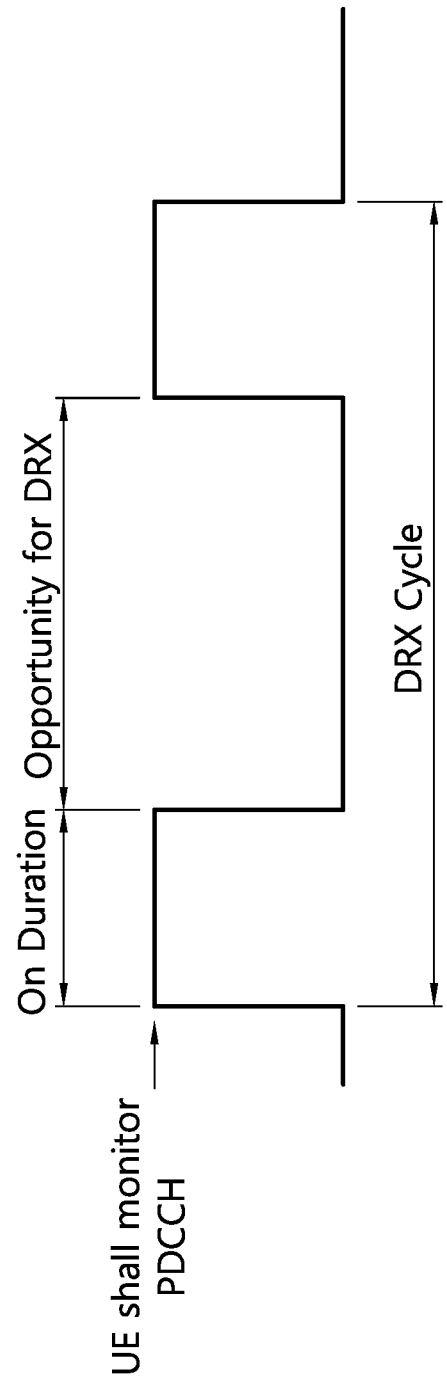
FIG. 16 illustrates a DRX cycle and an operation of a UE in the DRX cycle.

FIG. 16 illustrates a DRX cycle and an operation of a UE in the DRX cycle.

Referring to FIG. 16, a DRX cycle includes "On Duration" and "Opportunity for DRX". The DRX cycle defines a time interval in which "On Duration" is periodically repeated. "On Duration" represents a time period during which the UE monitors to receive the PDCCH. When DRX is configured, the UE performs PDCCH monitoring during "On Duration". If there is a PDCCH successfully detected during PDCCH monitoring, the UE operates an inactivity timer and maintains an awake state. Meanwhile, if there is no PDCCH successfully detected during PDCCH monitoring, the UE enters a sleep state after the "On Duration" is over. Hereinafter, "On Duration" may be simply referred to as a DRX ON interval, and "Opportunity for DRX" may be simply referred to as a DRX OFF interval.

Figure 17:
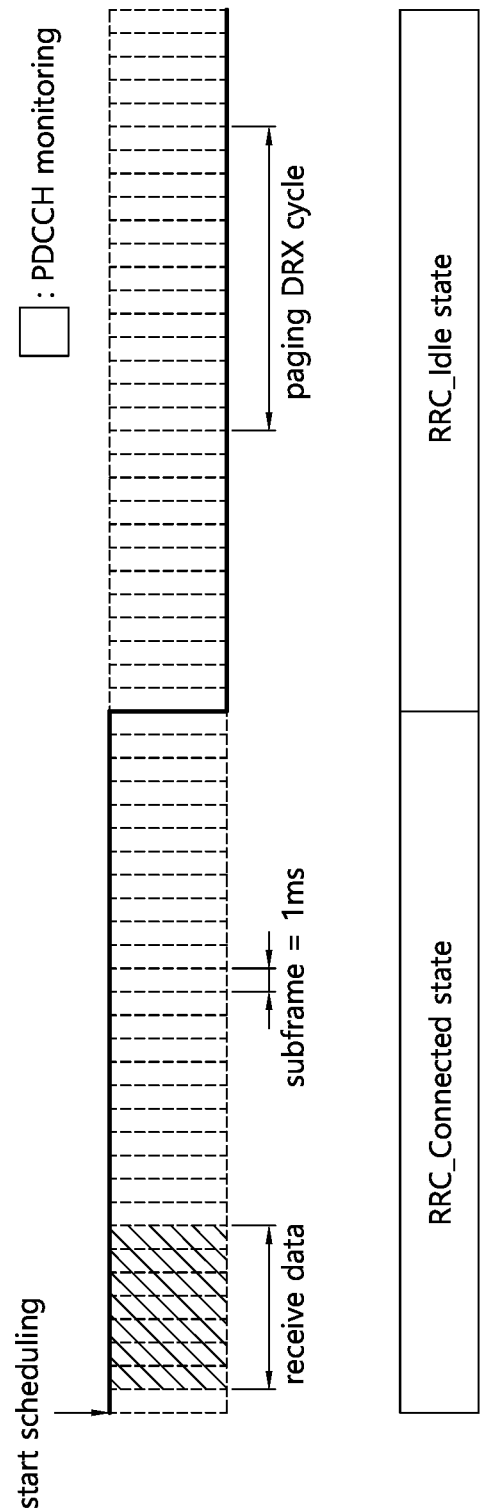
FIG. 17 schematically illustrates an example of an idle mode DRX operation.

FIG. 17 schematically illustrates an example of an idle mode DRX operation.

Referring to FIG. 17, when there is traffic directed to a UE in an RRC_IDLE state (hereinafter referred to as an "idle state"), paging for the UE occurs. The UE may wake up periodically (i.e., every (paging) DRX period) to monitor the PDCCH. If paging does not exist, the UE transitions to a connected state and receives data, and if there is no data, the UE may enter a sleep mode again.

Hereinafter, a connected mode DRX (C-DRX) will be described.

Figure 18:
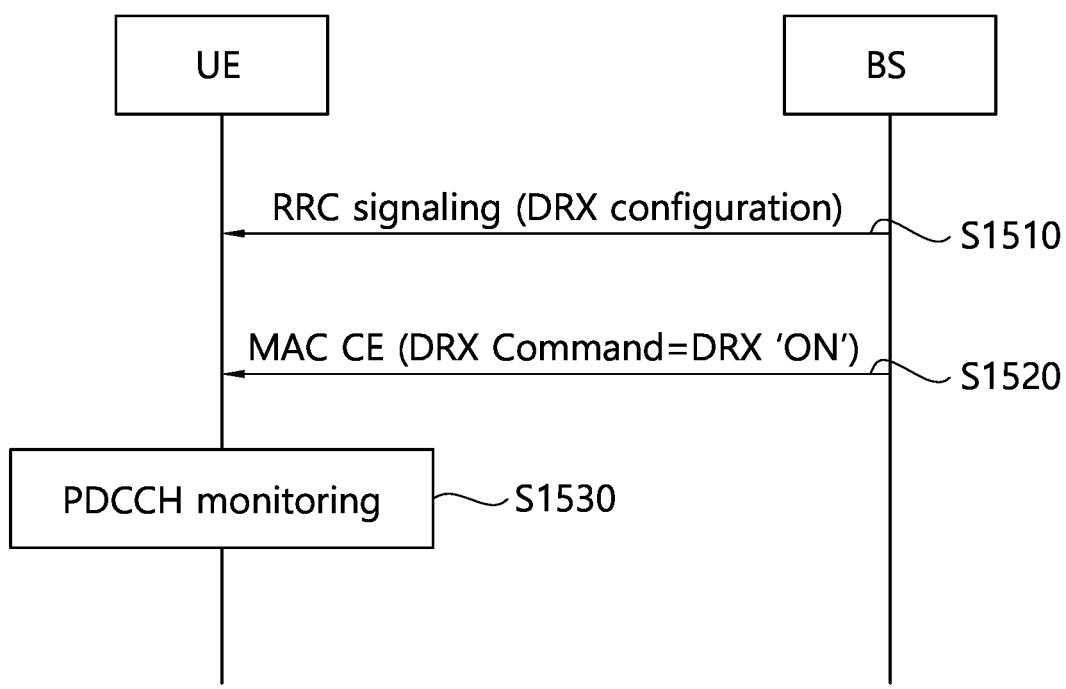
FIG. 18 is a flowchart illustrating an example of a method of performing a C-DRX operation.

FIG. 18 is a flowchart illustrating an example of a method of performing a C-DRX operation.

The UE may receive RRC signaling (e.g., MAC-MainConfig IE) including DRX configuration information from a BS (S1510).

Here, the DRX configuration information may include the following information.

onDurationTimer: The number of PDCCH subframes that may be continuously monitored at the beginning of a DRX cycle drx-InactivityTimer: The number of PDCCH subframes that may be continuously monitored when the UE decodes the PDCCH having scheduling information drx-RetransmissionTimer: The number of PDCCH subframes to be continuously monitored when HARQ retransmission is expected longDRX-Cycle: On-duration occurrence period drxStartOffset: Subframe number in which DRX cycle starts drxShortCycleTimer: Short DRX cycle number shortDRX-Cycle: DRX cycles that operate as many as drxShortCycleTimer when Drx-InactivityTimer is terminated.

In addition, when DRX "ON" is configured through a DRX command of a MAC command element (CE) (S1520), the UE monitors the PDCCH for the ON duration of the DRX cycle based on the DRX configuration (S1530).

Figure 19:
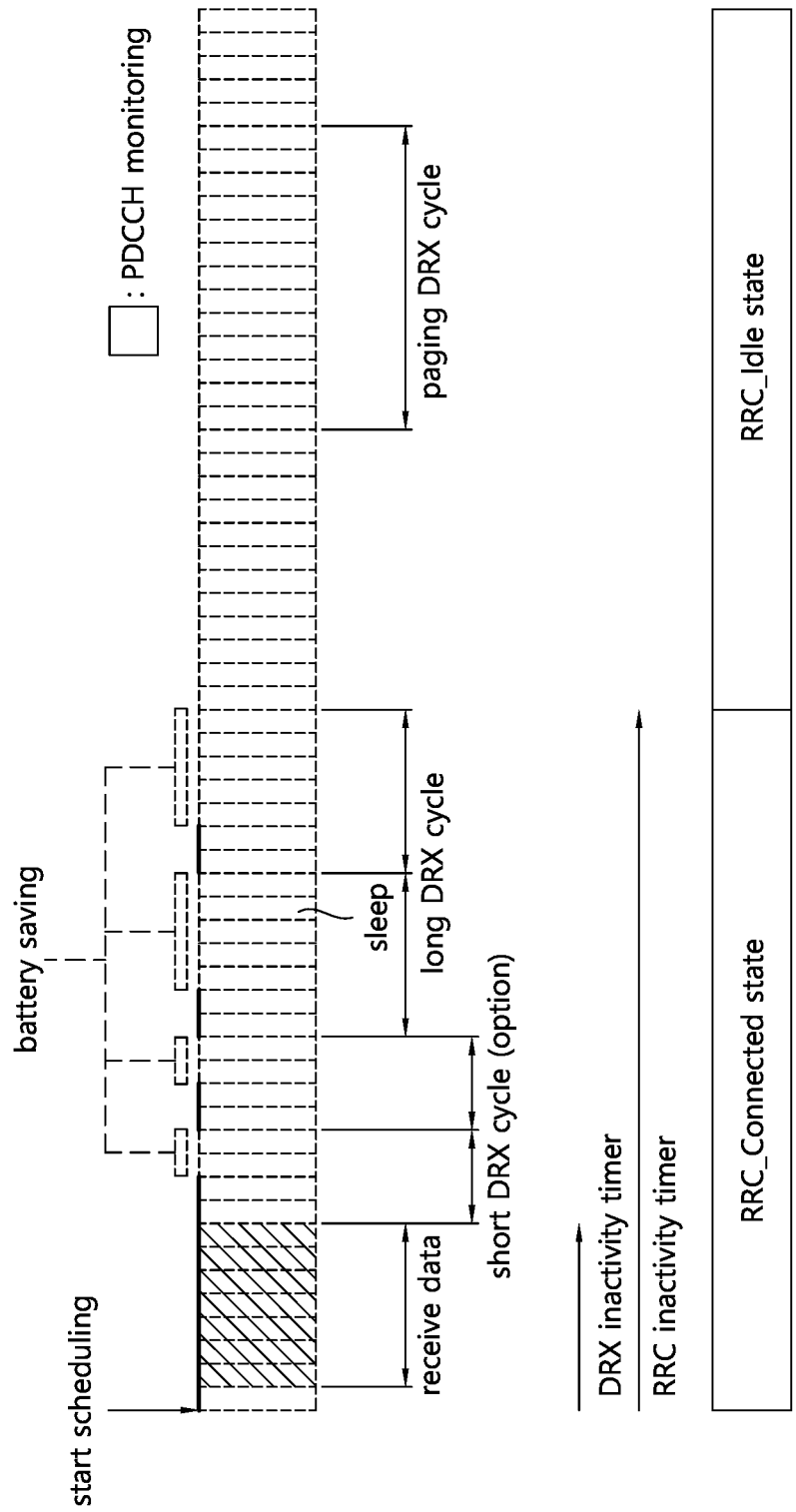
FIG. 19 schematically illustrates an example of a C-DRX operation.

FIG. 19 schematically illustrates an example of a C-DRX operation.

When the UE receives scheduling information (e.g., a DL grant) in an RRC_CONNECTED state (hereinafter, it may be referred to as a connected state), the UE may execute a DRX inactive timer and an RRC inactive timer.

When the DRX inactive timer expires, the DRX mode may be started. The UE may wake up from the DRX cycle and monitor the PDCCH (on the duration timer) for a predetermined time.

Here, in a case in which a short DRX is configured, when the UE starts the DRX mode, the UE first starts with a short DRX cycle, and after the short DRX cycle is terminated, the UE starts with a long DRX cycle. Here, the long DRX cycle may correspond to a multiple of the short DRX cycle. In addition, in the short DRX cycle, the UE may wake up more often. After the RRC inactive timer expires, the UE may switch to the IDLE state and perform the IDLE mode DRX operation.

Hereinafter, a beam management method will be described.

The UE may perform a DRX operation for power consumption reduction or another operation for power saving. When the UE is in the DRX OFF state (idle/sleep state) or when the UE performs an operation for power saving, a beam management operation may not be performed for a predetermined period of time.

If the UE does not perform the beam management operation for a certain period of time, and then attempts to receive DL again to receive downlink data (e.g., downlink (DL) packet), the previously configured beam information may be too old to be suitable for application to the UE at a corresponding time point. Then, the UE may not properly perform DL reception.

To solve this problem, the UE may perform beam measurement again and report a beam measurement result, or if it is determined that beam failure occurs due to beam failure detection, a beam recovery process may have to be performed. However, if the above process continues to occur when the DRX is turned on or the power saving state/power saving mode is terminated, latency occurs until the UE performs DL reception, and power consumption of the UE is also increased.

Figure 20:
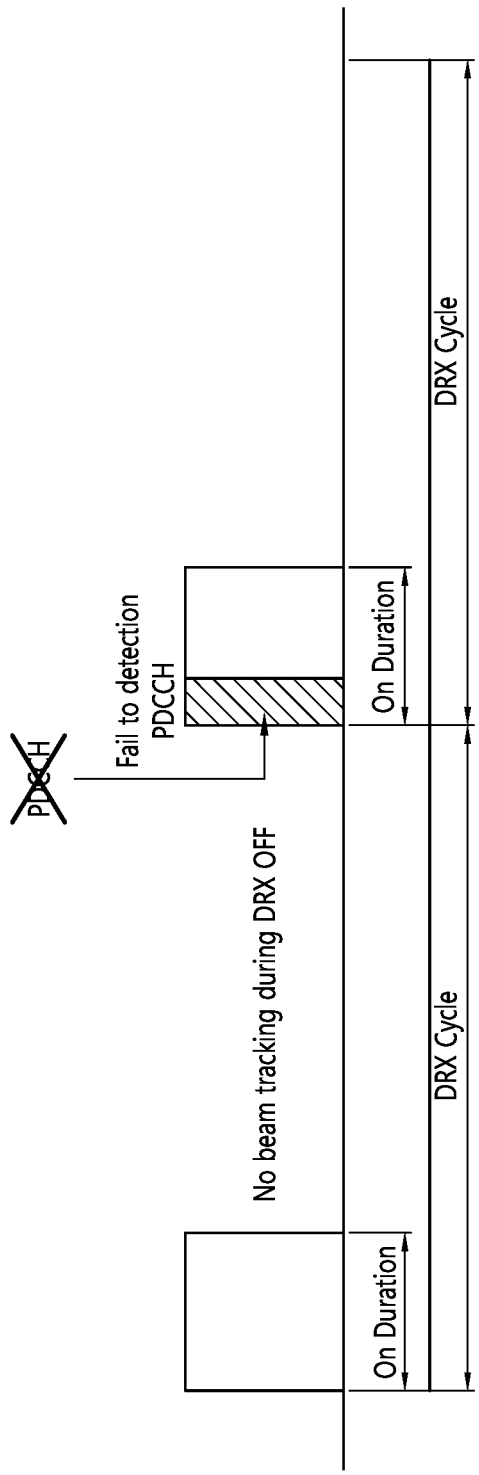
FIG. 20 illustrates a beam management operation of a UE.

FIG. 20 illustrates a beam management operation of a UE.

Referring to FIG. 20, when the UE is in the power saving mode or the DRX OFF state in the NR, the UE may not perform a beam management operation during a corresponding period. Then, the beam management information cannot be updated during the power saving mode or the DRX OFF period. Accordingly, when the UE enters the DRX ON state or performs DL reception (PDCCH detection) again out of the power saving mode, PDCCH detection may not be successfully performed.

If there is a reference signal for beam management which is periodically transmitted, then, the UE may receive the reference signal and perform beam measurement. Also, the UE reports a measurement result to the BS. Thereafter, the BS may update the beam information applied to the PDCCH transmission and the like and transmit the PDCCH to the UE using an appropriate beam.

However, even with the beam management process, it may be difficult to find a suitable beam and the UE may not be able to properly receive the PDCCH. In this case, the beam measurement result related to the beam failure detection may not exceed a predetermined criterion, and in this case, the UE may determine that a beam failure has occurred and perform a beam failure recovery (BFR) process.

In general, in a frequency range 2 (FR2) environment, when the UE is in a power saving mode or a DRX OFF state and then performs DL reception (PDCCH detection) again, the UE may not be able to successfully perform PDCCH detection immediately. Accordingly, it may be necessary to continuously perform a beam management process or perform a beam failure detection and recovery process. In this case, a delay and power consumption may be large until the UE successfully performs actual DL reception.

In consideration of this problem, the present disclosure proposes a method for efficiently performing beam management in an environment in which a UE performs a power saving operation.

In order for the UE, which performs power saving or DRX operation, to perform DL reception (PDCCH monitoring) again, a more efficient beam management or beam failure recovery process is required. To this end, the present disclosure proposes the following.

The following procedure may be applied in the case of a primary cell (PCell) when the UE performs a single cell operation or when carrier aggregation (CA) is applied.

[A-1]

A BS may transmit a reference signal (RS) to the UE. Some or all of the following RSs may be transmitted. The UE may receive the following RSs.

1) RS for beam management (BM-RS)
2) RS for beam failure detection (FD-RS)
3) RS for beam recovery Among the RSs, which RS is to be transmitted may be configured for the UE through RRC signaling or the like.

When there are a plurality of RS sets (beam index sets) for the BM-RS, information on which set is used to transmit the BM-RS may be configured through RRC signaling or the like.

Or, there may be a plurality of RS sets (beam index sets), one RS set may be transmitted, and information on which of the corresponding RS sets will be actually transmitted may be configured through RRC signaling or the like.

The UE determines the transmitted RS information and receives an RS using the information configured as described above.

Characteristically, such an RS may have the form of a CSI-RS.

[A-2]

A network may configure whether to transmit the RS. For example, if the network configures RS transmission, an RS may be transmitted under conditions described later, and if the network does not configure RS transmission, an RS may not be transmitted.

The RS (e.g., the RS as proposed in [A-1] described above) may be transmitted at the following time point. That is, at the following time point, the network may transmit the corresponding RS to the UE. In addition, the UE may assume that the corresponding RS is transmitted from the network at the following time point.

A) At or before the start of DRX ON duration

B) At or before the start of DRX ON duration, if a length of a DRX cycle is longer than X msec C) When the power saving mode is terminated or at a time point before the end of the power saving mode D) When the power saving mode is terminated or at a time point before the end of the power saving mode, if an execution period of the power saving mode is more than a certain value, E) A time point after the lapse of Y msec time from a time point at which DRX ON was terminated (a time point at which DRX OFF starts).

F) A time point after the lapse of Z msec time from the start of power saving mode G) A time point after the lapse of P msec from a time point of transmission (reception) of the last PDCCH/PDSCH H) It may be assumed that, if a beam failure declaration occurs due to failure of a beam measurement configured while DRX is off, the UE does not immediately perform beam recovery but starts beam recovery at a next DRX ON duration. In this case, the network may transmit an RS for beam recovery before DRX ON duration.

I) When DRX ON duration occurs, the UE performs beam measurement, and if beam failure occurs, RS transmission may be expected. It may be assumed that beam failure may be indicated directly through a primary cell or the like.

The values of X, Y, Z, and/or P may be configured from a network through RRC signaling or the like or may be previously determined in standard specifications. Alternatively, the values X, Y, Z, and/or P may be a value that is dynamically changed implicitly in association with a DRX parameter, BWP, etc. or may be explicitly indicated through a MAC CE or DCI.

Characteristically, the corresponding RS may be transmitted aperiodically when the above conditions are satisfied. Alternatively, there may be a time point at which the RS may be transmitted periodically, and if the above conditions are satisfied, the RS may be transmitted at the most adjacent RS transmission available time point afterwards. Alternatively, it may be assumed that the UE transmits a transmission request for the measurement RS for a secondary cell (SCell) through a primary cell or through another scheduling cell. It is assumed that the RS is transmitted at an opportunity (occasion) that most satisfies a processing time requirement according to a preset candidate RS configuration when the UE requests the transmission.

That is, if the above conditions are satisfied, the UE may receive the RS on the assumption that the corresponding RS is transmitted aperiodically. Alternatively, there may be a time point at which the RS may be transmitted periodically, and if the above conditions are satisfied, the UE may receive the RS on the assumption that the RS is transmitted at the most adjacent RS transmission available time point afterwards.

Upon receiving the corresponding RS, the UE determines that data to be received from the network exists, and then performs an operation (e.g., PDCCH monitoring) for data reception. If the RS is not transmitted at a time point when the RS is to be transmitted, the UE may determine that data to be received from the network does not exist. Thereafter, the UE may not perform the operation for data reception (e.g., PDCCH monitoring). For example, the UE may enter a sleep state or a power saving mode.

When the above conditions are satisfied, the network may aperiodically transmit the corresponding RS to the UE. Alternatively, there may be a time point at which the RS can be transmitted periodically, and when the above conditions are satisfied, the network may transmit the RS at the most adjacent RS transmission available time point afterwards. The network may transmit the corresponding RS only when there is DL data to be transmitted to the UE, and may not transmit the corresponding RS if there is no DL data to be transmitted to the UE.

[A-3]

The UE may perform the following operation upon receiving the RS. Receiving RS may be the same as proposed in [A-1]. A transmission time point of the corresponding RS may be the same as that proposed in [A-2].

a) The UE may perform beam measurement and report a result to the BS.

b) The UE performs beam failure measurement. Thereafter, when a beam failure is detected, the UE may perform a beam failure recovery (BFR) process.

c) The UE may perform a contention-free PRACH (CFRA) based beam failure recovery (BFR) process.

d) The UE may perform a contention-based PRACH (CBRA) based beam failure recovery (BFR) process.

Information on which operation the UE is to perform upon receiving the RS may be configured through RRC signaling or the like.

Alternatively, the operation performed by the UE may vary according to a type of the transmitted RS. For example, when 1) the BM-RS proposed in [A-1] is configured, the UE may perform the a) beam measurement. Alternatively, when 2) FD-RS proposed in [A-1] is configured, the UE may perform the b) beam failure measurement. Alternatively, when the 3) RS for beam recovery proposed in [A-1] is configured, the UE may perform c) CFRA-based BFR or d) CBRA-based BFR.

The network may transmit different RSs according to an operation to be performed by the UE. For example, if the UE needs to perform a) beam measurement, the network may configure to transmit 1) BM-RS proposed in [A-1] and transmit the corresponding RS. Or, if the UE needs to perform b) beam failure measurement, the UE may configure to b) transmit the FD-RS proposed in [A-1] and transmit the corresponding RS. Or, if the UE needs to perform c) CFRA-based BFR or d) CBRA-based BFR, the UE may configure to transmit the 3) beam recovery RS proposed in [A-1] and transmit the corresponding RS.

In [A-2], the transmitted RS and/or the operation of the UE may vary according to a length of the DRX cycle or an execution period of the power saving mode. For example, if the length of the DRX cycle is more than a specific value, the UE may assume that 3) the beam recovery RS proposed in [A-1] is transmitted, and perform the c) CFRA-based BFR or d) CBRA-based BFR.

If the length of the DRX cycle is less than a specific value, the UE may assume that 1) BM-RS proposed in [A-1] is transmitted and the UE may perform the a) beam measurement. From a network perspective, in [A-2], an operation of a transmitted RS and/or an expected UE may vary according to the length of the DRX cycle or the duration of the power saving mode. For example, if the length of the DRX cycle is more than a specific value, the network may assume 3) transmission of the beam recovery RS proposed in [A-1] and determine that the UE will perform c) the CFRA-based BFR or d) the CBRA-based BFR. If the length of the DRX cycle is less than the specific value, the network may transmit the 1) the BM-RS proposed in [A-1] and determine that the UE will perform the a) beam measurement.

Alternatively, the UE may receive the BM-RS at a next BM-RS transmission time after the lapse of P msec from a time point of transmission (reception) of the last PDCCH or PDSCH, and report a corresponding result to the BS. This may also be performed even when the UE is in a power saving mode or in a DRX OFF situation.

As another example, if the DRX cycle is more than the specific value, the UE may assume that the RS is transmitted using RS set 1 when (or before) the DRX ON duration starts, and if the DRX cycle is less than the specific value, the UE may assume that the RS is transmitted using RS set 2 when (or before) the DRX ON duration starts. Upon receiving the RS, the UE performs beam measurement and reports a result to the BS. Alternatively, when an RS is transmitted through RS set 1, the UE may perform a beam failure recovery process using the corresponding RS, and when an RS is transmitted through RS set 2, the UE may perform beam measurement and report a result.

In the case of a single cell or a primary cell, it is necessary to acquire accurate beam information in DRX ON during a DRX operation in a case in which the UE skips beam management for a predetermined period. This may be to accurately determine whether there is a PDCCH regardless of whether there is actual DL traffic. Beam management may be maintained or skipped according to inter-time between DL scheduling. Accordingly, the BS may select the step of beam management and instruct the UE through signaling of an indication signal, and the UE may perform an appropriate step based thereon.

Examples of the step may include (1) measuring and reporting a set resource-based quantity, (2) CFRA-based beam recovery, and (3) CBRA-based beam recovery.

When the above proposal is applied, the UE may perform beam measurement, beam failure detection, and/or a beam failure recovery operation after the power saving mode or DRX OFF operation, and before performing DL reception (PDCCH monitoring) again, whereby the UE may perform DL reception faster than the related art.

In order for the UE, which performs a power saving or DRX operation, to perform DL reception (PDCCH monitoring) again, it is necessary to more efficiently perform a beam management or a beam failure recovery process. To this end, the following contents are proposed. When CA is applied to the UE, it may be applied in the case of a secondary cell.

In a case in which the UE performs a power saving or DRX operation in the secondary cell, when the UE performs DL reception (PDCCH monitoring) again in the secondary cell, the UE may not be able to properly perform DL reception (PDCCH monitoring). In order to solve this problem, RS transmission and UE operation in the secondary cell may be managed in a primary cell.

In the present disclosure, it is proposed to configure whether to monitor a PDCCH for a specific secondary cell, a PDCCH monitoring period, and/or whether to apply a power saving mode through a primary cell or another secondary cell.

When the UE needs to perform DL reception (PDCCH monitoring) again after power saving or DRX OFF operation in a specific secondary cell, the BS may aperiodically transmit the BM-RS, and the UE may perform beam measurement upon receiving the BM-RS. In this case, it may be difficult for the UE to receive the PDCCH for triggering the BM-RS in the secondary cell.

In consideration of this, the BM-RS for the secondary cell may be aperiodically transmitted in the primary cell or another secondary cell, and the UE may request to perform beam measurement using the PDCCH, etc., using the BM-RS.

Figure 21:
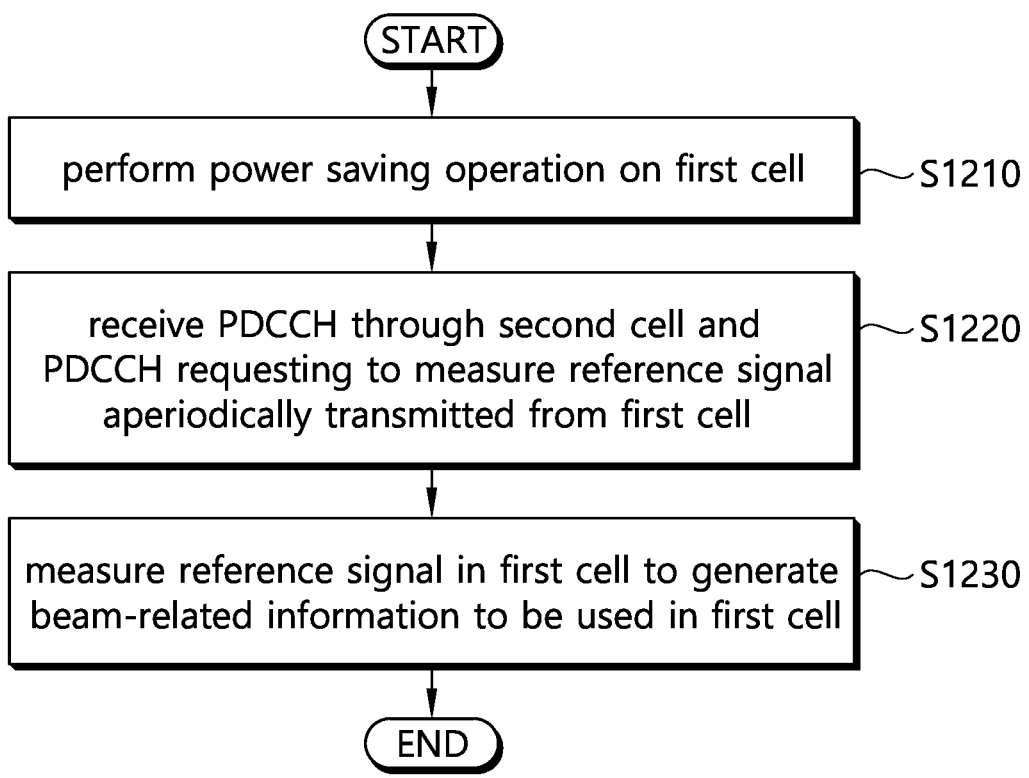
FIG. 21 illustrates a beam management method performed by a UE.

FIG. 21 illustrates a beam management method performed by a UE.

Referring to FIG. 21, the UE performs a power saving operation on a first cell (S1210). For example, the power saving operation may refer to not performing the beam management operation during a discontinuous reception (DRX) OFF duration of a DRX cycle including a DRX ON duration and the DRX OFF duration. In the NR, a millimeter frequency band, which is easy to secure a broadband frequency bandwidth, is supported to support a high data transfer rate. For example, a relatively low frequency band (FR1) up to 6 GHz or 7 GHz band and a relatively high frequency band (FR2) up to 52.6 GHz band are supported. Due to the use of such a high frequency band, high path loss may occur in NR, and to overcome this, a beamforming technique in which a signal is concentrated at a narrow transmission angle may be used. The UE may perform an operation for finding an optimal (reception) beam, for example, monitoring/measurement (RSRP, RSSI, RSRQ, SINR, etc.) of a plurality of beams, while changing a spatial reception parameter (reception filter). This operation may be referred to as a beam management operation.

The UE receives a physical downlink control channel (PDCCH) through a second cell (S1220). Here, the PDCCH may request to measure a reference signal transmitted aperiodically from the first cell. The PDCCH may inform any one of reference signal sets configured by a higher layer signal.

For example, the aperiodically transmitted reference signal may be a reference signal for beam management (BM-RS). A plurality of candidate RS sets may exist in the BM-RS that may be transmitted aperiodically. For example, there are a plurality of candidate CSI-RS sets, and a BM-RS may be transmitted using one of the sets. In this case, RS set information (e.g., an index) applied to the BM-RS transmitted aperiodically through the corresponding secondary cell may be informed through the primary cell or another secondary cell. In terms of signals, it may be informed using RRC or PDCCH.

For example, the reference signal may be received at a start point of the DRX ON duration or before a specific time from the start point for a DRX cycle including the discontinuous reception (DRX) ON duration and a DRX OFF duration. The DRX cycle may be a specific DRX cycle after receiving the PDCCH. The PDCCH may include information on a reception time of the reference signal (a transmission time of the reference signal from a network perspective), for example, information indicating the specific time and the specific DRX cycle.

That is, when the UE needs to perform DL reception (PDCCH monitoring) again after power saving or DRX OFF operation in a specific secondary cell, the BS may transmit RS aperiodically in the specific secondary cell, and upon receiving the RS, the UE may perform beam measurement, CI-RA-based beam recovery, or CBRA-based beam recovery. The BS may inform the configuration/information related to the RS to be aperiodically transmitted in the specific secondary cell through the primary cell or another secondary cell (using RRC signaling or a PDCCH).

Information on which RS is transmitted by the BS may also be set. The types of RSs that may be transmitted may be, for example, as follows.

1) RS for beam management (BM-RS)
2) RS for beam failure detection (FD-RS)
3) RS for beam recovery That is, the reference signal may be a beam management reference signal, a beam failure detection reference signal, or a beam recovery reference signal, and a higher layer signal indicating a type of the reference signal may be further received. For example, when there are a plurality of RS sets (beam index sets) for the BM-RS, information on which set is used to transmit the BM-RS may be configured for the UE through RRC signaling or the like.

Alternatively, there may be a plurality of RS sets (beam index sets), one RS set may be transmitted, and information on which of the corresponding RS sets is actually transmitted may be configured. The above configuration may be configured using RRC or PDCCH. Characteristically, these RSs may have the form of CSI-RS.

The UE measures the reference signal in a first cell and generates beam-related information to be used in the first cell (S1230). The UE may report the beam-related information to the BS.

Specifically, upon receiving an aperiodic RS, the UE may perform the following operation.

a) The UE performs beam measurement and reports a result to the BS.

b) The UE performs beam failure measurement. Thereafter, when a beam failure is detected, a beam failure recovery (BFR) process is performed.

c) The UE performs a contention-free PRACH (CFRA) based beam failure recovery process.

d) The UE performs a contention-based PRACH (CBRA) based beam failure recovery process.

In this case, information on which operation the UE is to perform upon receiving the RS may be configured through RRC signaling or a PDCCH.

Alternatively, the operation performed by the UE may vary according to a type of a transmitted RS. For example, when the 1) BM-RS is configured, the UE may perform the a) beam measurement. Or, when the 2) FD-RS is configured, the UE may perform the b) beam failure measurement. Alternatively, when the 3) RS for beam recovery is configured, the UE may perform the c) CFRA-based BFR or d) CBRA-based BFR.

Alternatively, the operation performed by the UE may vary according to an index of a transmitted RS set. For example, when RS set 1 is configured, the UE may perform the a) beam measurement. Alternatively, when RS set 2 is configured, the UE may perform the c) CI-RA-based BFR or d) CBRA-based BFR.

When the UE is switched from the DRX OFF state to the DRX ON state in a specific secondary cell, the BS may transmit the PDCCH through the primary cell or another secondary cell. In addition, it may be indicated through the PDCCH that an aperiodic RS is transmitted. The UE receiving the PDCCH may receive the corresponding RS, perform beam measurement, and report a corresponding result to the BS.

The first cell may be a secondary cell configured for the UE, and the second cell may be a primary cell configured for the UE or another secondary cell.

In addition, the UE may further receive, through the second cell, a configuration of at least one of whether to monitor the PDCCH for the first cell, a PDCCH monitoring period, and whether to apply a power saving mode.

Meanwhile, the reference signal may be received at a start point of the DRX ON duration or before a specific time from the start point when (or as long as) a length of the DRX cycle including the DRX ON duration and the DRX OFF duration is a predetermined value or more.

Alternatively, the reference signal or another reference signal may be received at a time point after the lapse of a predetermined time from a time point at which the DRX ON duration is terminated in the DRX cycle including the DRX ON duration and the DRX OFF duration.

As another example, when the UE is switched from the DRX OFF state to the DRX ON state in a specific secondary cell, the BS transmits a PDCCH through a primary cell or another secondary cell, and indicates that an aperiodic RS is transmitted through the PDCCH. Here, information (RS set index or RS type) on the transmitted RS and an operation of the UE that will use the RS (e.g., beam measurement, CFRA-based BFR, or CBRA-based BFR) may be configured together. Upon receiving this, the UE may perform a configured operation using the configured RS.

In a power saving situation, the UE may not perform beam management for a configured CSI-RS or SSB resource for a predetermined time. Thereafter, when attempting to receive DL data such as a DL packet again, if the UE attempts to receive DL based on the previously configured beam information, the beam information may be too old, which does not match a current channel state, so that DL reception may not be properly performed. In this case, it may be necessary to start again from beam recovery. If the operation based on multiple beams is for a secondary cell, whether to perform PDCCH monitoring and/or CSI reporting and/or beam management in the secondary cell needs to be dynamically adjusted, which may be indicated in another cell through a MAC CE message.

The advantage of this method is to prevent an occurrence of unnecessary power consumption in a DRX ON duration in which there is no actual DL traffic during the DRX operation. That is, beam management may also be skipped before DL traffic actually occurs. If DL traffic occurs and new data scheduling is started in another cell, beam management of the secondary cell may be performed through indication signaling in the other cell. Specifically, a method of beam management may also be indicated. For example, the CFRA-based beam recovery and/or the CBRA-based beam recovery may be informed.

Figure 22:
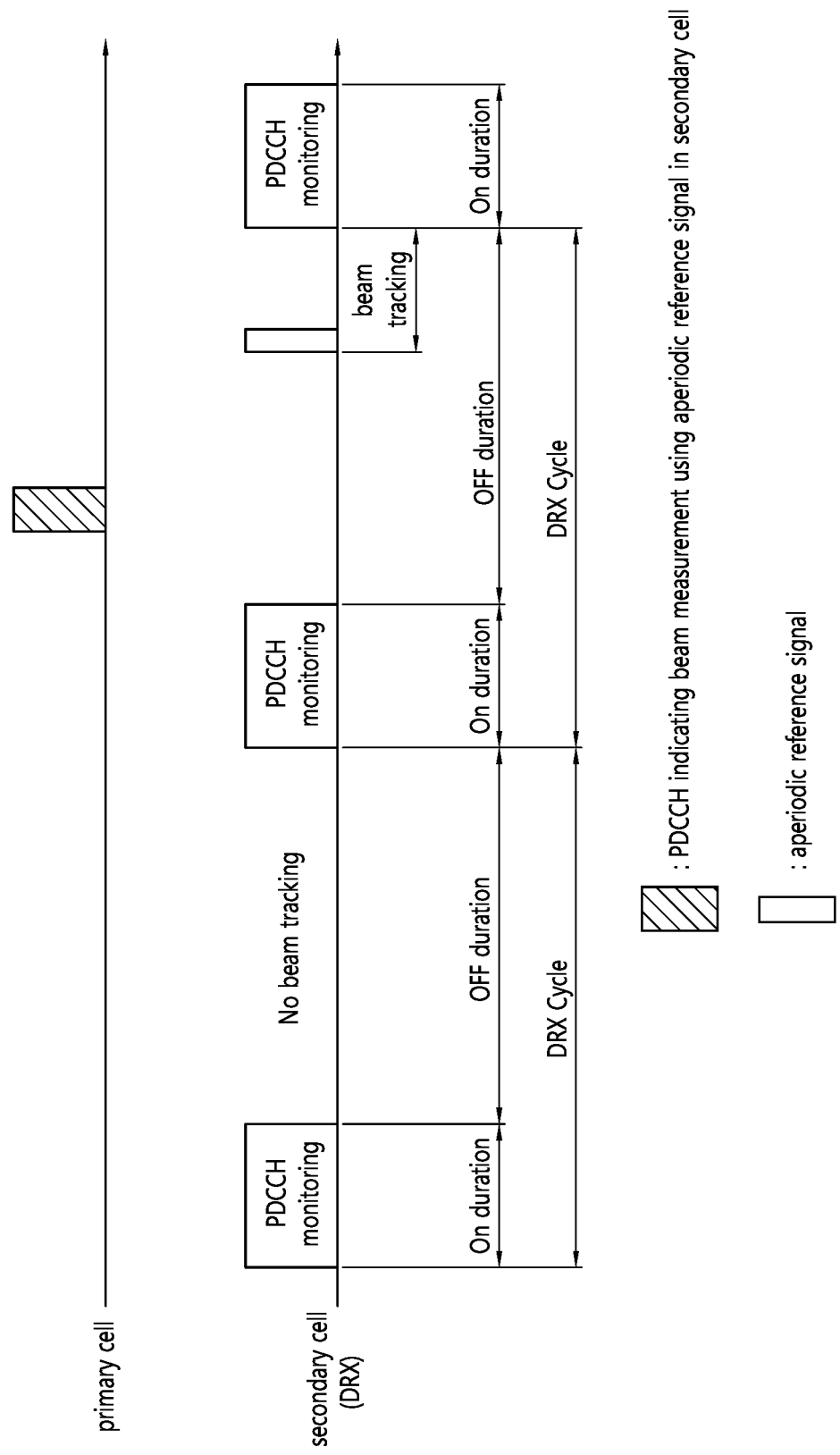
FIG. 22 illustrates a PDCCH monitoring method of a UE.

FIG. 22 illustrates a PDCCH monitoring method of a UE.

Referring to FIG. 22, a primary cell and a secondary cell may be configured in a UE. In such a carrier aggregation situation, the UE may perform a DRX operation to save power for the secondary cell.

That is, in the DRX cycle including the discontinuous reception (DRX) ON duration and DRX OFF duration, beam tracking is not performed in the DRX OFF duration (beam management-related measurement is not performed).

The UE may receive a PDCCH indicating beam measurement using an aperiodic reference signal in the secondary cell through the primary cell. From the BS perspective, when DL traffic transmitted through the secondary cell occurs to the UE, the PDCCH is transmitted to the UE through, for example, the primary cell to induce the UE to update the beam-related information for the secondary cell.

Then, the UE may perform beam measurement using the aperiodic reference signal within the DRX OFF duration and update the beam-related information using the result. The UE may report beam-related information to the BS. The BS may increase transmission efficiency by transmitting the DL traffic to the UE using an optimal beam based on the beam-related information.

As another example, in the case of an intra-band CA, beam management may be performed in only one carrier in DRX ON duration, and may be used in an intra-band carrier based thereon. This may be performed through grouping of carriers in which the DRX is aligned between intra-band CAs and performs beam management. To this end, a beam-related RS/measurement may be configured, and a beam-related RS/measurement configuration used during an inactivity duration may be separately set, so that beam management for each carrier may be used in the corresponding duration.

In the case of intra-band CA, it may be assumed that the DRX configuration is configured in common, but a timer is separately operated for each carrier. Therefore, the DRX ON duration starts at the same time but a time to enter the inactivity duration or DRX OFF is different for each carrier, and therefore, it may be assumed that measurement during DRX ON duration and measurement of the inactivity duration are configured to be different and measurement occurs in one representative carrier during DRX ON duration.

As another example, when it is assumed that a cell requiring beam management is the secondary cell, it may be assumed that cross-carrier scheduling is received in DRX ON duration or whether to require beam management may be indicated by a cross-carrier. When an indication that beam management is required through another cell is received, regardless of DRX ON duration or at the start of the DRX ON duration, the corresponding measurement may be performed, and otherwise, beam management may be performed after transmission of a control signal through a cross-carrier. Such triggering may consider the following:

Enable the entire beam management process: Beam measurement→failure→CFRA→CBRA may be performed as needed in order.

CBRA: Since there is a high probability of beam failure, RACH may be performed again based on an SSB.

CFRA: It is possible to immediately perform recovery for a beam exceeding a threshold based on a configured beam recovery RS. If the contents fail, it is transferred to CBRA.

In addition, several recovery RS sets to be used during such triggering may be given in advance or may be transmitted by RRC signaling and configured to be different.

When beam management is required for the secondary cell, a portion in which a beam is not properly managed through DRX may be effectively recovered through other cells. To this end, it may be assumed that at least beam-related DCI triggering or MAC CE comes from another cell or it may be assumed that a first PDCCH of the DRX ON duration is always cross-carrier scheduling.

When a cell requiring beam management is a primary-secondary cell, it is assumed that a corresponding operation may be performed in the primary cell/primary cell group.

It may be assumed that, when the cell requiring beam management is the primary cell, the triggering DCI/MAC CE is transmitted through the primary cell. For example, it may be considered to use a wake-up signal or to transmit information on the PDCCH together. Alternatively, the corresponding operation may be considered in association with the DRX configuration.

Even if the DRX is configured, measurement related to the beam is performed, but different measurement configurations and requirements/behaviors may be assumed for each DRX state. For example, when DRX is off, it is assumed that the measurement RS cycle is very long and recovery is not performed, and when a failure occurs and when DRX is on duration, it may be assumed that a very short cycle and CBRA-based recovery are immediately started and it may be assumed that the existing general process is performed during an inactivity duration.

For example, when the DRX ON duration starts, the UE may receive the BM-RS. Here, the BS may separately configure an RS set to be transmitted in this case to the UE. The UE receives the BM-RS, performs beam measurement, and reports a result to the BS. Here, characteristically, the UE may perform such an operation only when the DRX cycle is set to a specific value or greater.

When such a proposal is applied, the UE may perform beam measurement, beam failure detection, and/or a beam failure recovery operation before the UE performs DL reception (PDCCH monitoring) again, after the power saving mode or DRX OFF operation, thereby performing DL reception faster than the related art.

Figure 23:
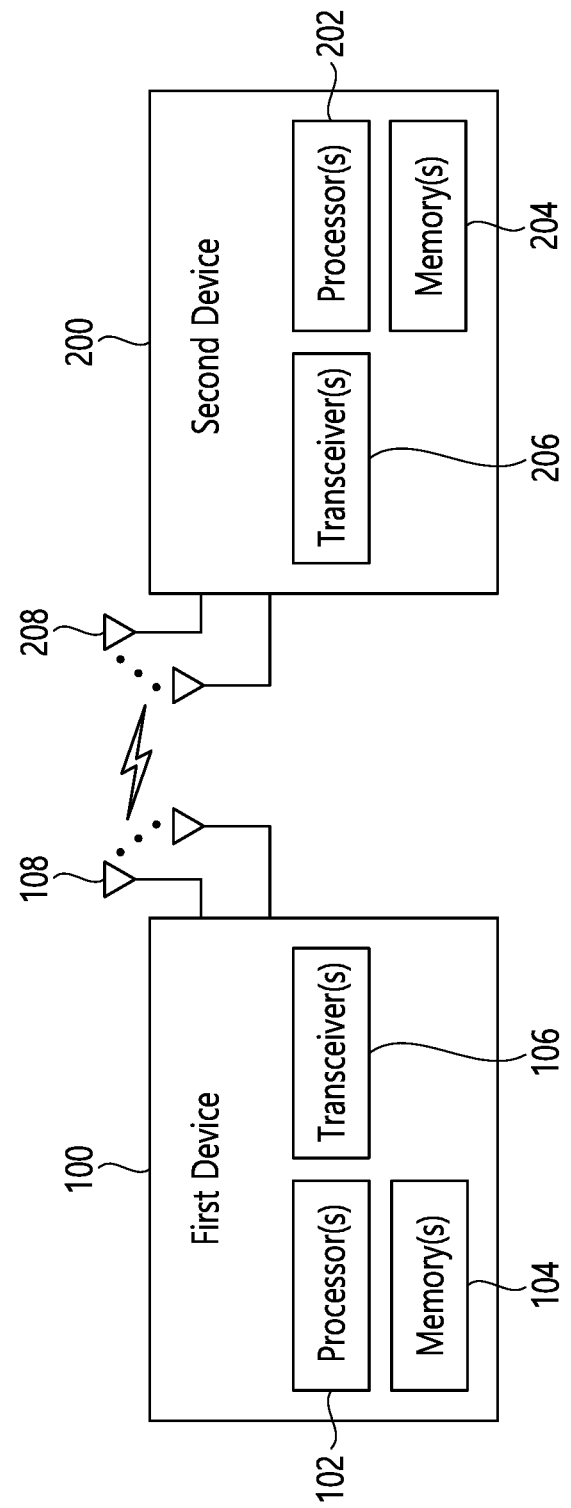
FIG. 23 illustrates a wireless device applicable to the present disclosure.

FIG. 23 illustrates a wireless device applicable to the present disclosure.

Referring to FIG. 23, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Hereinafter, a structure of a signal processing module of a transmitter to which the present disclosure is applied will be described.

Figure 24:
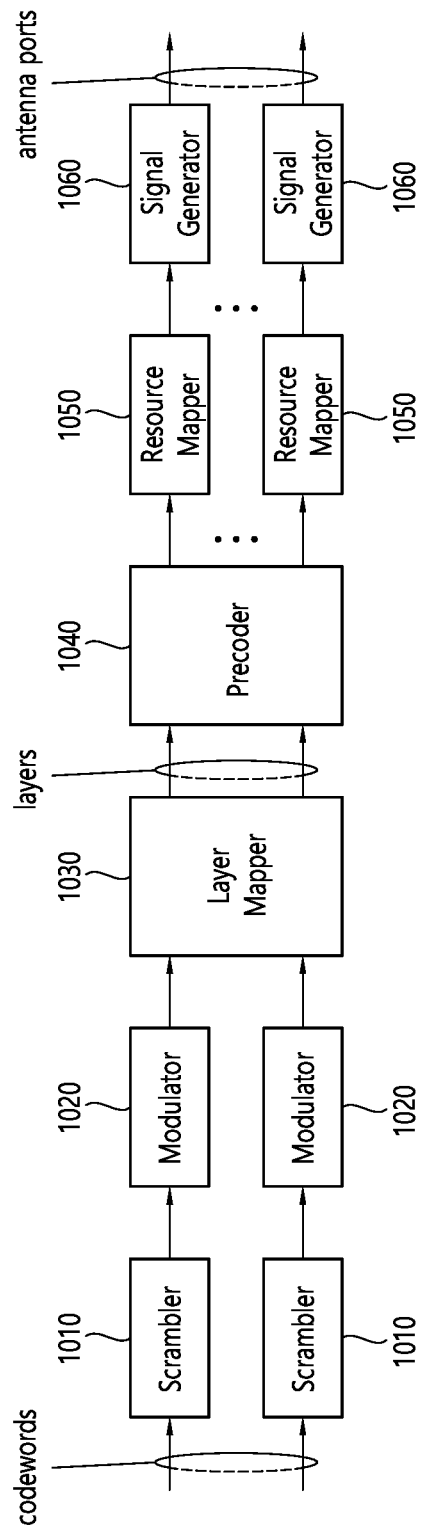
FIG. 24 shows an example of a structure of a signal processing module in a transmitter.

FIG. 24 is an example of a structure of a signal processing module of a transmitter.

Referring to FIG. 24, a signal processing circuit 1000 may include a scrambler 1010, a modulator 1020, a layer mapper 1030, a precoder 1040, a resource mapper 1050, and a signal generator 1060. Although not limited thereto, the operations/functions of FIG. 24 may be performed in the processors 102 and 202 and/or the transceivers 106 and 206 of FIG. 23. The hardware elements of FIG. 24 may be implemented in the processors 102 and 202 and/or the transceivers 106 and 206 of FIG. 23. For example, blocks 1010 to 1060 may be implemented in the processors 102 and 202 of FIG. 23. Further, blocks 1010 to 1050 may be implemented in the processors 102 and 202 of FIG. 23, and block 1060 may be implemented in the transceivers 106 and 206 of FIG. 23.

A codeword may be converted into a wireless signal through the signal processing circuit 1000 of FIG. 24. Here, the codeword is an encoded bit sequence of an information block. The information block may include a transport block (e.g., a UL-SCH transport block or a DL-SCH transport block). A wireless signal may be transmitted through various physical channels (e.g., PUSCH or PDSCH).

Specifically, the codeword may be converted into a bit sequence scrambled by the scrambler 1010. A scrambled sequence used for scramble may be generated based on an initialization value, and the initialization value may include ID information of a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to one or more transport layers by the layer mapper 1030. Modulation symbols of each transport layer may be mapped to corresponding antenna port(s) by the precoder 1040 (precoding). An output z of the precoder 1040 may be obtained by multiplying an output y of the layer mapper 1030 by an N*M precoding matrix W. Here, N is the number of antenna ports, and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. A time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A Signal processing process for a received signal in a wireless device may be configured as the reverse of the signal processing process 1010 to 1060 of FIG. 24. For example, a wireless device (e.g., 100 and 200 in FIG. 23) may receive a wireless signal from the outside through an antenna port/transceiver. The received wireless signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be reconstructed into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 25:
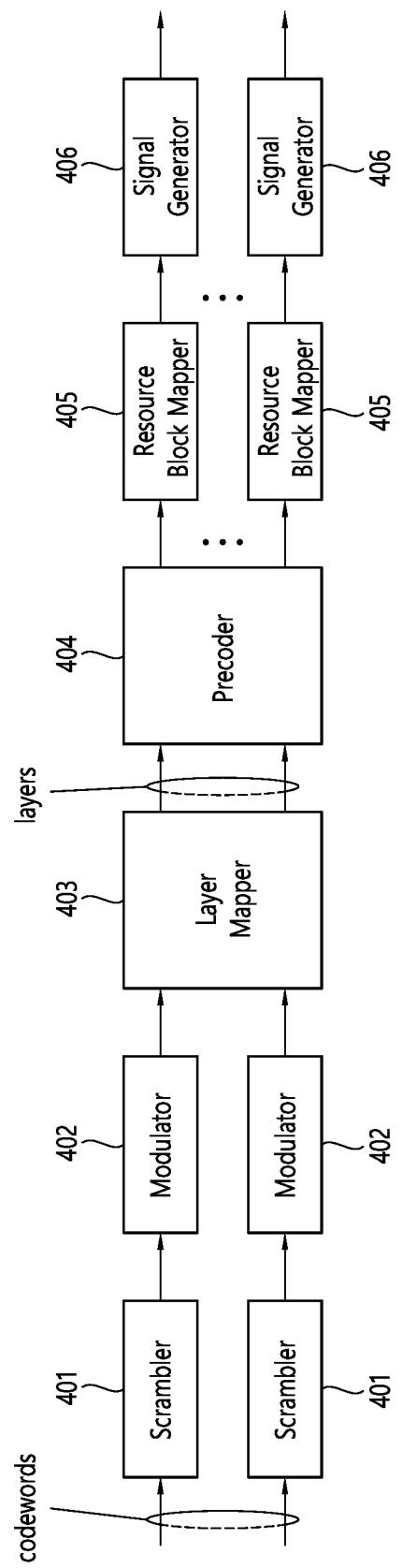
FIG. 25 shows another example of a structure of a signal processing module in a transmitter.

FIG. 25 shows another example of a structure of a signal processing module in a transmission device. Here, signal processing may be performed by a processor of a UE/BS such as the processors 102 and 202 of FIG. 23.

Referring to FIG. 25, a transmission device (e.g., 102, 202, 106, or 206) in a UE or a BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 26:
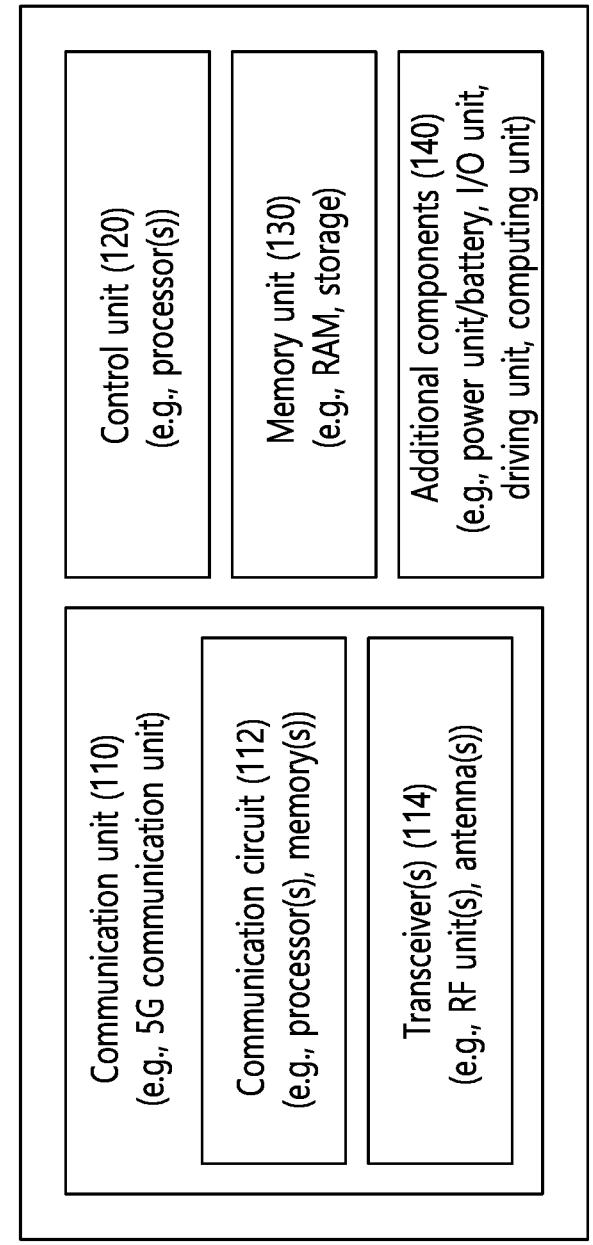
FIG. 26 illustrates an example of a wireless communication device for implementing the present disclosure.

FIG. 26 shows another example of a wireless device applied to the present disclosure. The wireless device may be implemented in various forms according to use-examples/services.

Referring to FIG. 26, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 29), the vehicles (100b-1 and 100b-2 of FIG. 29), the XR device (100c of FIG. 29), the hand-held device (100d of FIG. 29), the home appliance (100e of FIG. 29), the IoT device (100f of FIG. 29), a digital broadcast terminal, a hologram device, a public safety device, an MTC device, a medicine device, a fintech device (or a finance device), a security device, a climate/environment device, the AI server/device (400 of FIG. 29), the BSs (200 of FIG. 29), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 27:
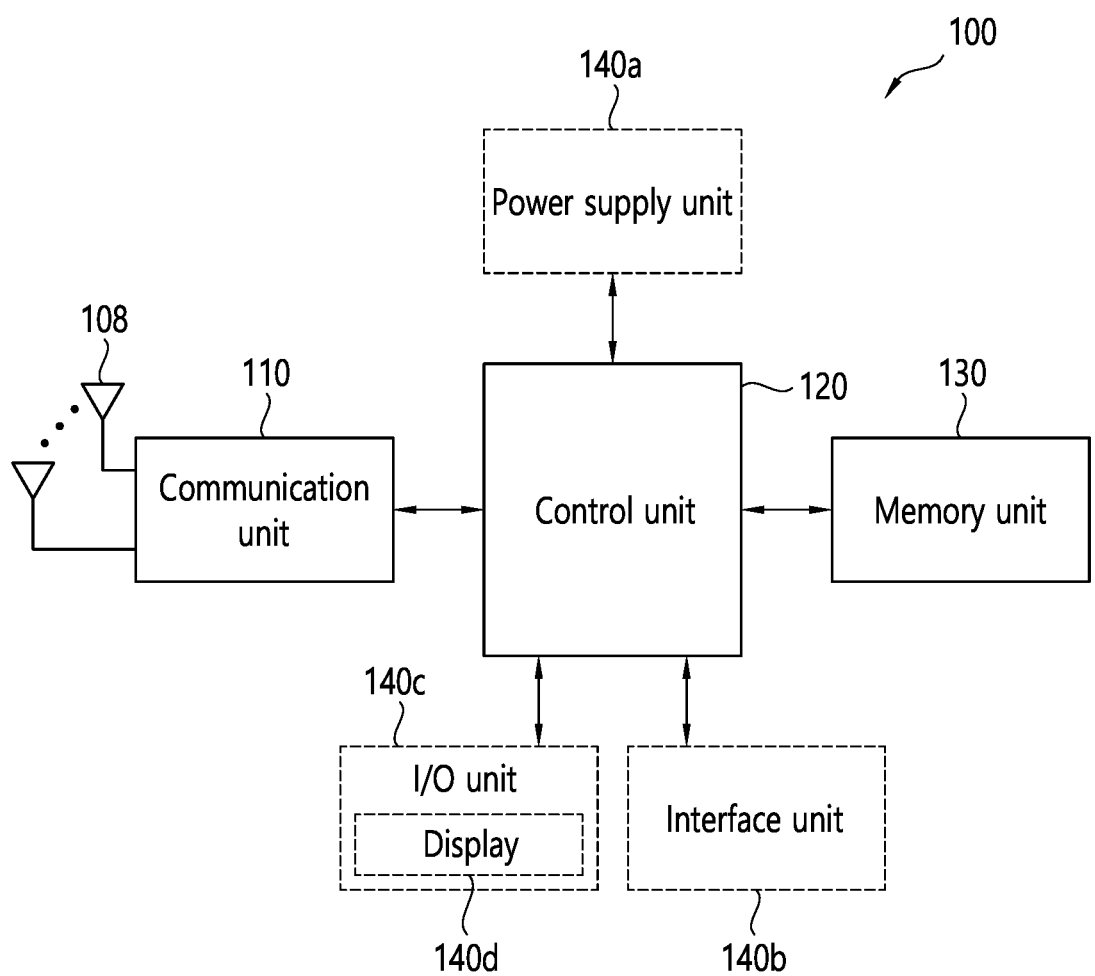
FIG. 27 shows another example of a wireless device applied to the present disclosure.

FIG. 27 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 25.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
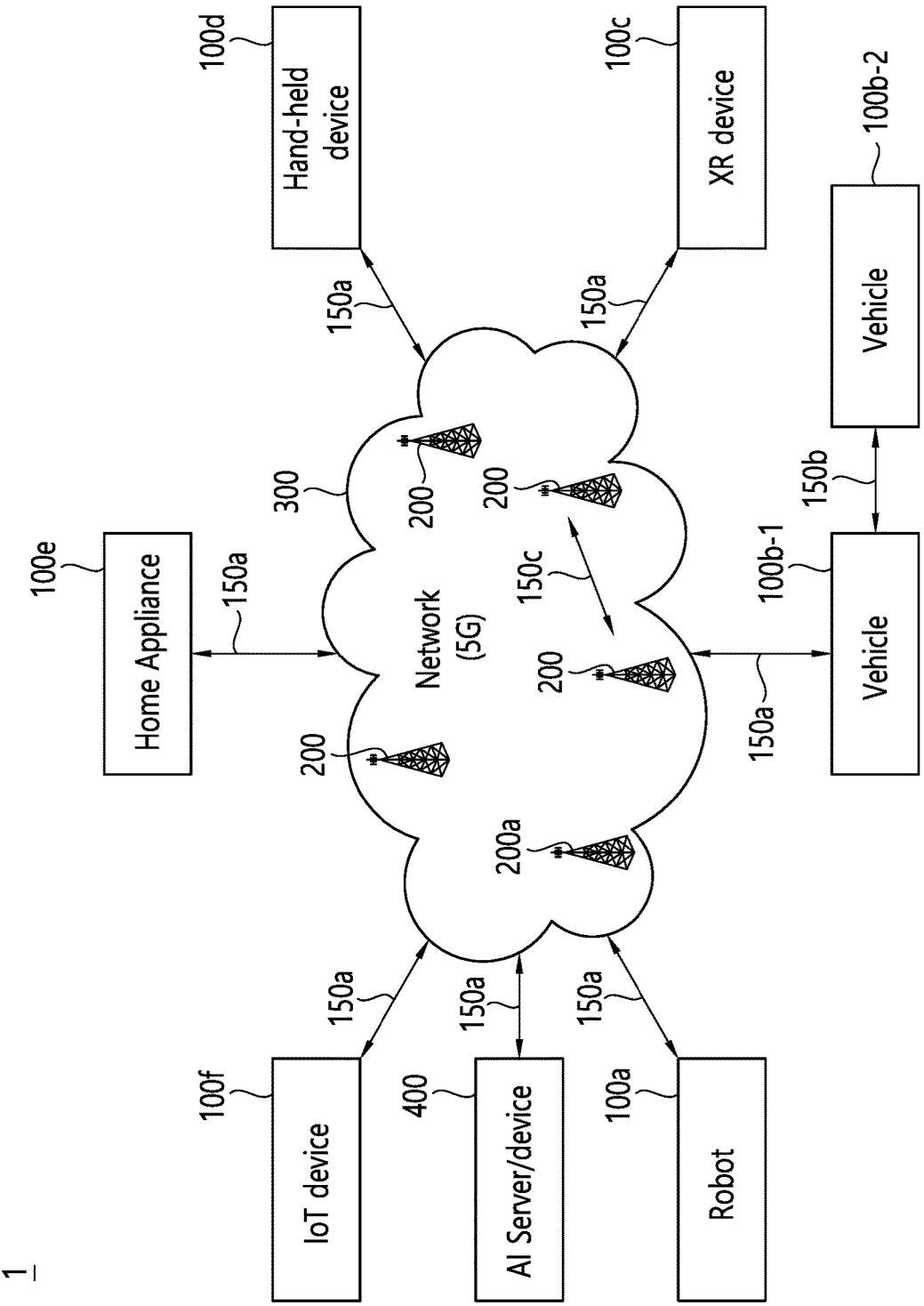
FIG. 28 illustrates a communication system 1 applied to the present disclosure.

FIG. 28 illustrates a communication system 1 applied to the present disclosure.

Referring to FIG. 28, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 29:
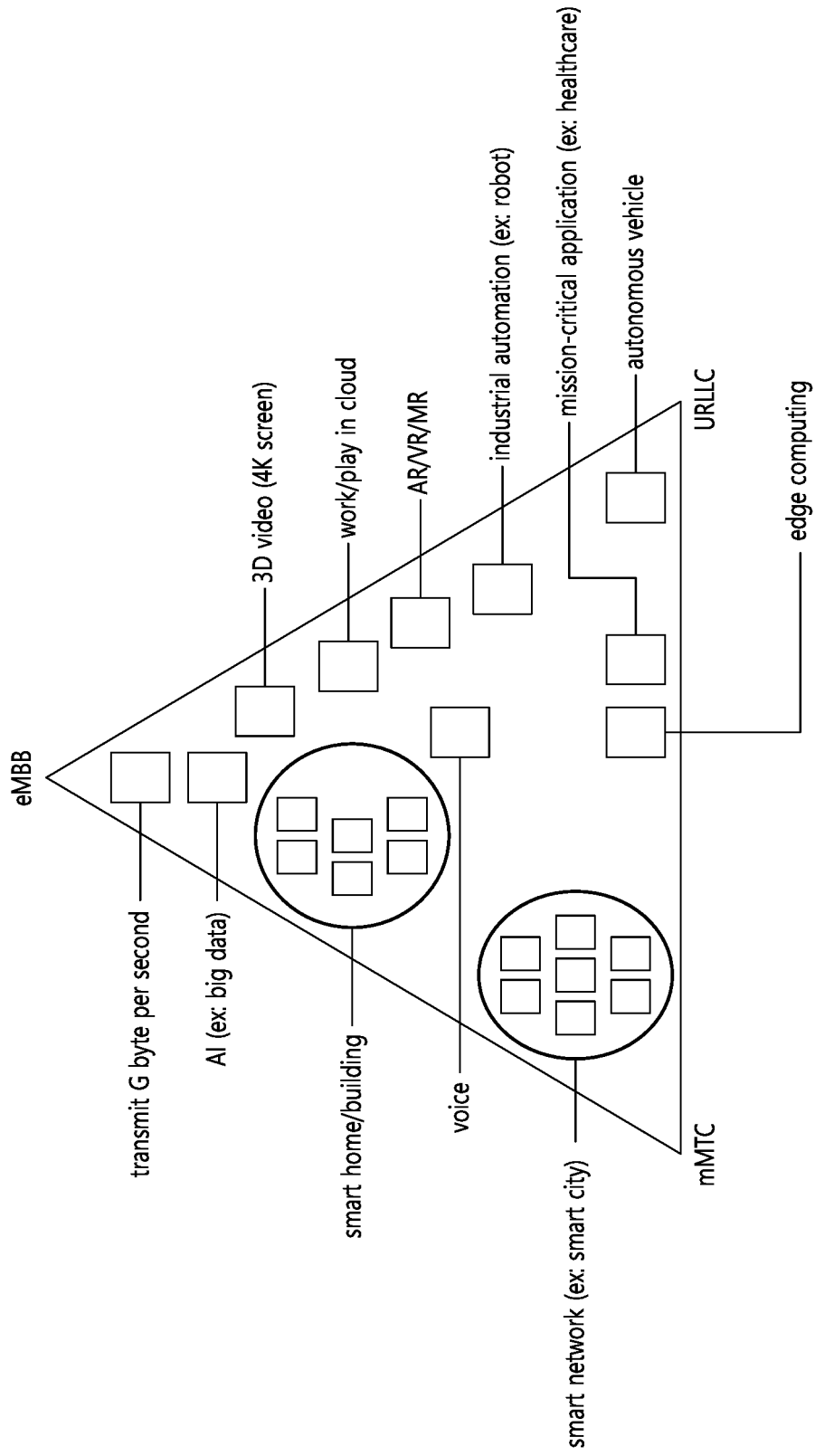
FIG. 29 illustrates an example of 5G use scenarios to which technical features of the present disclosure can be applied.

FIG. 29 illustrates an example of 5G use scenarios. The 5G usage scenario illustrated in FIG. 29 is merely exemplary, and the technical features of the present disclosure may also be applied to other 5G usage scenarios that are not illustrated in FIG. 29.

Referring to FIG. 29, three major requirement areas of 5G include: (1) an enhanced mobile broadband (eMBB) area, (2) a massive machine type communication (mMTC) area, and (3) an ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video, and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are other key factors requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per km$^2$. The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture, and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 29 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver TVs with resolution of 4K or higher (6K, 8K and higher) as well as virtual reality (VR) and augmented reality (AR). VR and AR applications involve almost immersive sports events. Specific applications may require special network configuration. For example, in the case of VR games, a game company may need to integrate a core server with an edge network server of a network operator to minimize latency.

The automotive industry is expected to be an important new driver for 5G together with many use cases for mobile communication regarding vehicles. For example, entertainment for passengers requires both high capacity and high mobile broadband. The reason is that future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as a smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas are highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability, and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

Figure 30:
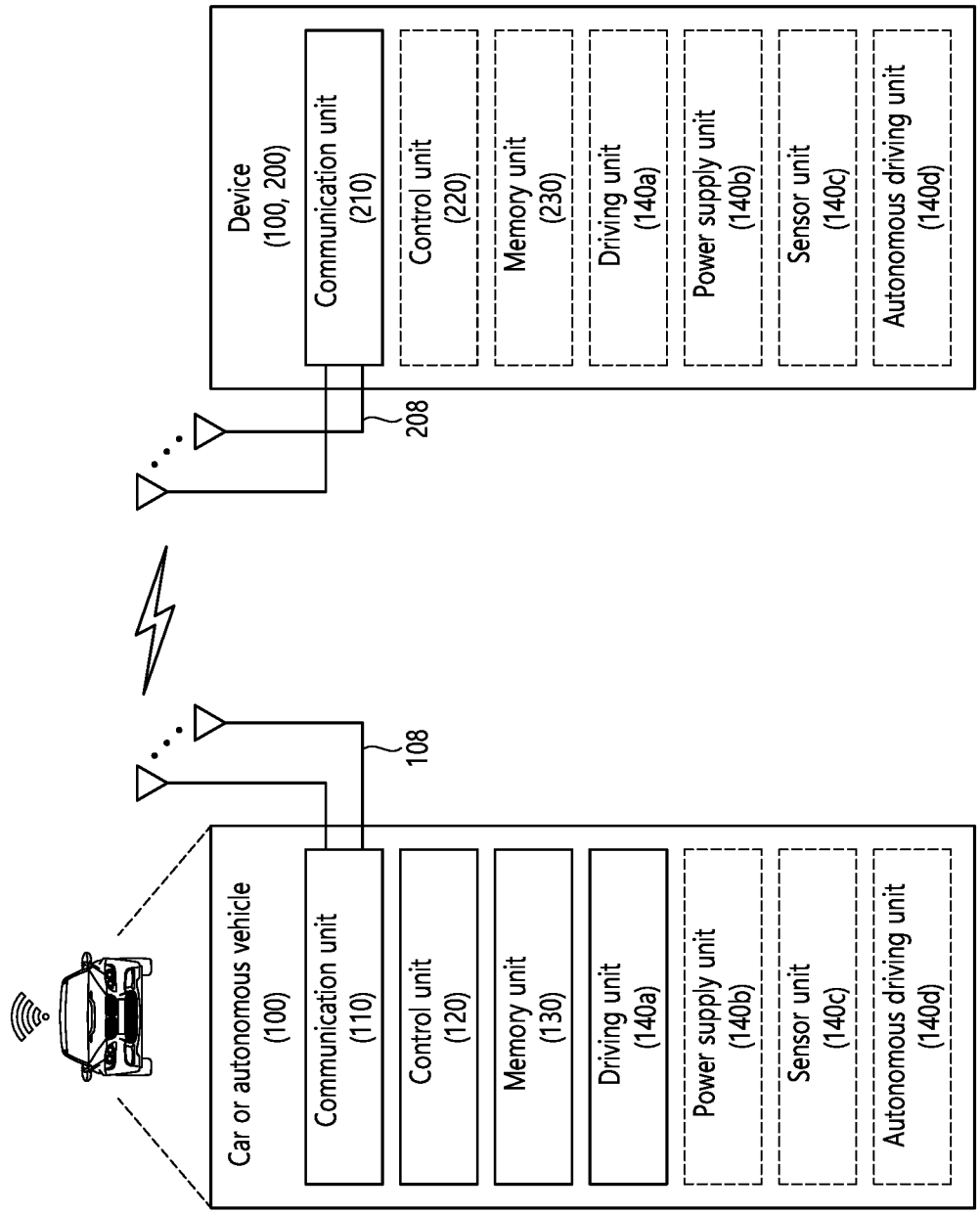
FIG. 30 illustrates a vehicle or an autonomous vehicle applicable to the present disclosure.

FIG. 30 illustrates a vehicle or an autonomous vehicle applied to the present disclosure. Vehicles or autonomous vehicles may be implemented as mobile robots, vehicles, trains, aerial vehicles (AVs), ships, etc.

Referring to FIG. 30, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A beam management method performed by a user equipment (UE) in a wireless communication system, the method comprising:
    performing a power saving operation on a first cell;
    receiving request information through a physical downlink control channel (PDCCH) of a second cell, wherein the request information requests a measurement of a reference signal aperiodically transmitted from the first cell; and
    measuring the reference signal in the first cell; and
    generate beam-related information for the first cell based on the measured reference signal,
    wherein the reference signal is received at a start point of a discontinuous reception (DRX) ON duration or before a specific time from the start point for a DRX cycle including the DRX ON duration and a DRX OFF duration, and
    wherein based on a length of the DRX cycle being greater than or equal to a specific value, the reference signal measured by the UE is a first reference signal for the beam-related information and based on the length of the DRX cycle being less than the specific value, the reference signal measured by the UE is a second reference signal for the beam-related information.

2. The method of claim 1, wherein the PDCCH indicates any one of reference signal sets configured by a higher layer signal.

3. The method of claim 1, wherein a configuration for at least one of whether to perform PDCCH monitoring, a PDCCH monitoring period, and whether to apply a power saving mode for the first cell is received through the second cell.

4. The method of claim 1, wherein the power saving operation is an operation of not performing a beam management operation in the DRX OFF duration of the DRX cycle including the DRX ON duration and the DRX OFF duration.

5. The method of claim 1, wherein the first cell is a secondary cell configured for the UE and the second cell is a primary cell or another secondary cell configured for the UE.

6. The method of claim 1, wherein the reference signal is received at the start point of the DRX ON duration or before the specific time from the start point, only when a length of the DRX cycle is a predetermined value or greater.

7. The method of claim 1, wherein another reference signal is further received at a time point after the lapse of a predetermined time from a time point at which the DRX ON duration is terminated in the DRX cycle including the DRX ON duration and the DRX OFF duration.

8. The method of claim 1, wherein the reference signal is a reference signal for beam management, a reference signal for beam failure detection, or a reference signal for beam recovery.

9. The method of claim 8, wherein a higher layer signal indicating a type of the reference signal is further received.

10. The method of claim 1, wherein the beam-related information is reported to a base station.

11. The method of claim 1, wherein the PDCCH is monitored in the first cell based on the beam-related information.

12. The method of claim 1, wherein the power saving operation is not performed on the second cell.

13. The method of claim 1, wherein the PDCCH includes information indicating the specific time.

14. A user equipment (UE) comprising:
    a transceiver configured to transmit and receive a wireless signal; and
    a processor operably coupled with the transceiver,
    wherein the processor is configured to perform a power saving operation on a first cell,
    to receive request information through a physical downlink control channel (PDCCH) of a second cell, wherein the request information requests a measurement of a reference signal aperiodically transmitted from the first cell, and
to measure the reference signal in the first cell, and
to generate beam-related information for the first cell based on the measured reference signal,
wherein the reference signal is received at a start point of a discontinuous reception (DRX) ON duration or before a specific time from the start point for a DRX cycle including the DRX ON duration and a DRX OFF duration, and
wherein based on a length of the DRX cycle being greater than or equal to a specific value, the reference signal measured by the UE is a first reference signal f or the beam-related information and based on the length of the DRX cycle being less than the specific value, the reference signal measured by the UE is a second reference signal for the beam-related information.

\* \* \* \* \*